United States Patent
Schmitt et al.

(10) Patent No.: US 11,386,060 B1
(45) Date of Patent: Jul. 12, 2022

(54) TECHNIQUES FOR VERIFIABLY PROCESSING DATA IN DISTRIBUTED COMPUTING SYSTEMS

(71) Applicant: Amazon Technologies, Inc., Seattle, WA (US)

(72) Inventors: Ryan Charles Schmitt, Seattle, WA (US); Nguyen Nguyen, Seattle, WA (US); Jason Neil Yakimovich, Ontario (CA)

(73) Assignee: Amazon Technologies, Inc., Seattle, WA (US)

( * ) Notice: Subject to any disclaimer, the term of this patent is extended or adjusted under 35 U.S.C. 154(b) by 1474 days.

(21) Appl. No.: 14/863,298

(22) Filed: Sep. 23, 2015

(51) Int. Cl.
| G06F 16/00 | (2019.01) |
| G06F 16/21 | (2019.01) |
| G06F 16/27 | (2019.01) |
| G06F 16/22 | (2019.01) |

(52) U.S. Cl.
CPC ........ G06F 16/219 (2019.01); G06F 16/2282 (2019.01); G06F 16/275 (2019.01)

(58) Field of Classification Search
CPC ........ G06F 17/30309; G06F 17/30339; G06F 17/30581; G06F 16/219; G06F 16/2282; G06F 16/275
See application file for complete search history.

(56) References Cited

U.S. PATENT DOCUMENTS

| 5,239,640 A | 8/1993 | Froemke et al. |
| 5,488,701 A | 1/1996 | Brady et al. |
| 5,506,809 A | 4/1996 | Csoppenszky et al. |
| 5,586,291 A | 12/1996 | Lasker et al. |
| 5,701,407 A | 12/1997 | Matsumoto et al. |
| 5,729,671 A | 3/1998 | Peterson et al. |
| 5,737,745 A | 4/1998 | Matsumoto et al. |
| 5,751,997 A | 5/1998 | Kullick et al. |
| 5,900,007 A | 5/1999 | Nunnelley et al. |

(Continued)

FOREIGN PATENT DOCUMENTS

| CN | 1487451 A | 4/2004 |
| CN | 101043372 A | 9/2007 |

(Continued)

OTHER PUBLICATIONS

Advanced Computer & Network Corporation, "RAID Level 5: Independent Data Disks With Distributed Parity Blocks", May 12, 2011, from https://web.archive.org/web/20110512213916/http://www.acnc.com/raidedu/5, 2 pages.

(Continued)

*Primary Examiner* — Anhtai V Tran
(74) *Attorney, Agent, or Firm* — Davis Wright Tremaine LLP

(57) ABSTRACT

A system implements techniques for processing data across multiple layers. In some embodiments, a distributed data processing system tracks processing states via a monotonic process, whereby each state is irreversibly entered and cannot be entered without a predecessor state being verifiably completed. In some of such embodiments, a multi-layer data storage system tracks and processes data deletions across disparate layers such that a deletion state can be positively deduced from the deletion states of each of the disparate layers.

20 Claims, 10 Drawing Sheets

(56) References Cited

U.S. PATENT DOCUMENTS

| | | | |
|---|---|---|---|
| 6,023,710 A | 2/2000 | Steiner et al. |
| 6,138,126 A | 10/2000 | Hitz et al. |
| 6,208,999 B1 | 3/2001 | Spilo et al. |
| 6,249,836 B1 | 6/2001 | Downs et al. |
| 6,295,541 B1 * | 9/2001 | Bodnar | G06F 17/30581 |
| 6,374,264 B1 | 4/2002 | Bohannon et al. |
| 6,543,029 B1 | 4/2003 | Sandorfi |
| 6,578,127 B1 | 6/2003 | Sinclair |
| 6,604,224 B1 | 8/2003 | Armstrong et al. |
| 6,606,629 B1 | 8/2003 | DeKoning et al. |
| 6,665,565 B1 | 12/2003 | Stomberg et al. |
| 6,747,825 B1 | 6/2004 | Ng et al. |
| 6,768,863 B2 | 7/2004 | Ando et al. |
| 6,779,150 B1 | 8/2004 | Walton et al. |
| 6,862,362 B2 | 3/2005 | Gangadhar |
| 6,922,700 B1 | 7/2005 | Aggarwal et al. |
| 6,950,967 B1 | 9/2005 | Brunnett et al. |
| 6,959,326 B1 | 10/2005 | Day et al. |
| 7,076,604 B1 | 7/2006 | Thelin |
| 7,117,294 B1 | 10/2006 | Mi et al. |
| 7,120,737 B1 | 10/2006 | Thelin |
| 7,142,150 B2 | 11/2006 | Thackray |
| 7,243,233 B2 | 7/2007 | Kindberg et al. |
| 7,269,733 B1 | 9/2007 | O'Toole, Jr. |
| 7,299,359 B2 | 11/2007 | Hurley |
| 7,340,490 B2 | 3/2008 | Teloh et al. |
| 7,380,129 B2 | 5/2008 | Keohane et al. |
| 7,409,495 B1 | 8/2008 | Kekre et al. |
| 7,418,478 B1 | 8/2008 | Orling et al. |
| 7,487,316 B1 | 2/2009 | Hall et al. |
| 7,487,385 B2 | 2/2009 | Rodrigues et al. |
| 7,490,013 B2 | 2/2009 | Wells |
| 7,577,689 B1 | 8/2009 | Masinter et al. |
| 7,644,061 B1 | 1/2010 | Fallis et al. |
| 7,685,309 B2 | 3/2010 | Caronni et al. |
| 7,693,813 B1 | 4/2010 | Cao et al. |
| 7,730,071 B2 | 6/2010 | Iwasaki et al. |
| 7,774,466 B2 | 8/2010 | Coates et al. |
| 7,783,600 B1 | 8/2010 | Spertus et al. |
| 7,805,706 B1 | 9/2010 | Ly et al. |
| 7,814,078 B1 | 10/2010 | Forman et al. |
| 7,827,201 B1 | 11/2010 | Gordon et al. |
| 7,840,878 B1 | 11/2010 | Tang et al. |
| 7,929,551 B2 | 4/2011 | Dietrich et al. |
| 7,930,611 B2 | 4/2011 | Huang et al. |
| 7,937,369 B1 | 5/2011 | Dings et al. |
| 8,006,125 B1 | 8/2011 | Meng et al. |
| 8,015,158 B1 | 9/2011 | Mankovsky et al. |
| 8,019,925 B1 | 9/2011 | Vogan et al. |
| 8,060,473 B1 | 11/2011 | Dhumale et al. |
| 8,130,554 B1 | 3/2012 | Linnell |
| 8,156,381 B2 | 4/2012 | Tamura et al. |
| 8,261,033 B1 | 9/2012 | Slik et al. |
| 8,275,992 B2 | 9/2012 | Ushiku |
| 8,291,170 B1 | 10/2012 | Zhang et al. |
| 8,352,439 B1 | 1/2013 | Lee et al. |
| 8,370,315 B1 | 2/2013 | Efstathopoulos et al. |
| 8,386,841 B1 | 2/2013 | Renade |
| 8,391,226 B2 | 3/2013 | Rune |
| 8,413,187 B1 | 4/2013 | Del Sesto et al. |
| 8,464,133 B2 | 6/2013 | Grube et al. |
| 8,473,816 B2 | 6/2013 | Zvibel |
| 8,479,078 B2 | 7/2013 | Resch et al. |
| 8,504,518 B1 | 8/2013 | Ghemawat et al. |
| 8,504,535 B1 | 8/2013 | He et al. |
| 8,554,918 B1 | 10/2013 | Douglis |
| 8,595,596 B2 | 11/2013 | Grube et al. |
| 8,612,219 B2 | 12/2013 | Tsuchinaga et al. |
| 8,620,870 B2 | 12/2013 | Dwarampudi et al. |
| 8,621,069 B1 | 12/2013 | Tompkins |
| 8,671,076 B2 | 3/2014 | Price et al. |
| 8,699,159 B1 | 4/2014 | Malina |
| 8,706,980 B2 | 4/2014 | Dhuse et al. |
| 8,769,049 B2 | 7/2014 | Murphy et al. |
| 8,788,855 B2 | 7/2014 | Cong et al. |
| 8,806,296 B1 | 8/2014 | Lazier |
| 8,806,502 B2 | 8/2014 | Gargash et al. |
| 8,832,804 B1 | 9/2014 | Casey et al. |
| 8,838,911 B1 | 9/2014 | Hubin et al. |
| 8,850,288 B1 | 9/2014 | Lazier et al. |
| 8,868,825 B1 | 10/2014 | Hayes et al. |
| 8,869,001 B1 | 10/2014 | Lazier |
| 8,898,114 B1 | 11/2014 | Feathergill et al. |
| 8,935,221 B1 | 1/2015 | Lazier et al. |
| 8,935,761 B2 | 1/2015 | Gladwin et al. |
| 8,938,591 B2 | 1/2015 | Mark et al. |
| 8,959,067 B1 | 2/2015 | Patiejunas et al. |
| 8,972,677 B1 | 3/2015 | Jones |
| 8,984,363 B1 | 3/2015 | Juels et al. |
| 8,984,384 B1 | 3/2015 | Juels et al. |
| 8,990,215 B1 | 3/2015 | Reztlaff, II et al. |
| 9,002,805 B1 | 4/2015 | Barber et al. |
| 9,003,144 B1 | 4/2015 | Hayes et al. |
| 9,009,491 B2 | 4/2015 | Resch |
| 9,009,814 B1 | 4/2015 | Wertz et al. |
| 9,021,297 B1 | 4/2015 | Hayes et al. |
| 9,047,214 B1 | 6/2015 | Northcott |
| 9,047,306 B1 | 6/2015 | Frolund et al. |
| 9,052,942 B1 | 6/2015 | Barber et al. |
| 9,053,212 B2 | 6/2015 | Beckey et al. |
| 9,075,986 B1 | 7/2015 | Cato et al. |
| 9,092,441 B1 | 7/2015 | Patiejunas et al. |
| 9,110,797 B1 | 8/2015 | Lazier |
| 9,165,002 B1 | 10/2015 | Lazier |
| 9,208,018 B1 | 12/2015 | Northcott et al. |
| 9,213,485 B1 | 12/2015 | Hayes et al. |
| 9,213,709 B2 | 12/2015 | Patiejunas et al. |
| 9,218,244 B1 | 12/2015 | Hayes et al. |
| 9,223,789 B1 | 12/2015 | Seigle et al. |
| 9,225,675 B2 | 12/2015 | Patiejunas et al. |
| 9,244,761 B2 | 1/2016 | Yekhanin et al. |
| 9,250,811 B1 | 2/2016 | Patiejunas |
| 9,251,097 B1 | 2/2016 | Kumar et al. |
| 9,256,467 B1 | 2/2016 | Singh et al. |
| 9,256,761 B1 | 2/2016 | Sahu et al. |
| 9,270,683 B2 | 2/2016 | Coughlin et al. |
| 9,271,052 B2 | 2/2016 | Holden |
| 9,281,845 B1 | 3/2016 | Lazier |
| 9,298,760 B1 | 3/2016 | Li et al. |
| 9,313,172 B1 | 4/2016 | Brandwine |
| 9,354,683 B2 | 5/2016 | Patiejunas et al. |
| 9,372,854 B2 | 6/2016 | Gold et al. |
| 9,378,084 B2 | 6/2016 | Calder et al. |
| 9,405,333 B1 | 8/2016 | Pine |
| 9,448,614 B2 | 9/2016 | Slik |
| 9,449,346 B1 | 9/2016 | Hockey et al. |
| 9,459,959 B1 | 10/2016 | Franklin et al. |
| 9,461,876 B2 | 10/2016 | Van Dusen et al. |
| 9,495,249 B1 | 11/2016 | Franklin et al. |
| 9,495,255 B2 | 11/2016 | Davis et al. |
| 9,513,820 B1 | 12/2016 | Shalev |
| 9,563,681 B1 | 2/2017 | Patiejunas et al. |
| 9,672,110 B1 | 6/2017 | Patel |
| 9,753,669 B2 | 9/2017 | Ben-Shaul et al. |
| 9,785,495 B1 | 10/2017 | Lazier et al. |
| 9,792,179 B1 | 10/2017 | Lazier |
| 9,825,625 B2 | 11/2017 | Thalheim |
| 9,825,652 B1 | 11/2017 | Lazier |
| 9,838,041 B1 | 12/2017 | Lazier |
| 9,838,042 B1 | 12/2017 | Lazier |
| 9,853,662 B1 | 12/2017 | Lazier et al. |
| 9,866,242 B1 | 1/2018 | Lazier |
| 9,904,589 B1 | 2/2018 | Donlan et al. |
| 9,923,966 B1 | 3/2018 | Franklin et al. |
| 9,934,389 B2 | 4/2018 | Paterra et al. |
| 9,998,539 B1 | 6/2018 | Brock et al. |
| 10,061,668 B1 | 8/2018 | Lazier et al. |
| 10,097,356 B2 | 10/2018 | Zinder |
| 10,645,582 B2 | 5/2020 | Wohlert et al. |
| 2002/0055942 A1 | 5/2002 | Reynolds |
| 2002/0091903 A1 | 7/2002 | Mizuno |
| 2002/0103815 A1 | 8/2002 | Duvillier et al. |
| 2002/0122203 A1 | 9/2002 | Matsuda |
| 2002/0161972 A1 | 10/2002 | Talagala et al. |

(56) References Cited

U.S. PATENT DOCUMENTS

| | | |
|---|---|---|
| 2002/0186844 A1 | 12/2002 | Levy et al. |
| 2003/0032417 A1 | 2/2003 | Minear et al. |
| 2003/0033308 A1 | 2/2003 | Patel et al. |
| 2003/0149717 A1 | 8/2003 | Heinzman |
| 2003/0172325 A1 | 9/2003 | Wyatt et al. |
| 2004/0003272 A1 | 1/2004 | Bantz et al. |
| 2004/0040025 A1 | 2/2004 | Lehtinen |
| 2004/0054997 A1 | 3/2004 | Katragadda et al. |
| 2004/0098565 A1 | 5/2004 | Rohlman et al. |
| 2004/0128470 A1 | 7/2004 | Hetzler et al. |
| 2004/0230764 A1 | 11/2004 | Merchant et al. |
| 2004/0243737 A1 | 12/2004 | Beardsley et al. |
| 2004/0268037 A1 | 12/2004 | Buchanan et al. |
| 2005/0114338 A1 | 5/2005 | Borthakur et al. |
| 2005/0160427 A1 | 7/2005 | Ustaris |
| 2005/0187897 A1 | 8/2005 | Pawar et al. |
| 2005/0203976 A1 | 9/2005 | Hyun et al. |
| 2005/0262378 A1 | 11/2005 | Sleeman et al. |
| 2005/0267935 A1 | 12/2005 | Gandhi et al. |
| 2006/0004675 A1 | 1/2006 | Bennett et al. |
| 2006/0005074 A1 | 1/2006 | Yanai et al. |
| 2006/0015529 A1 | 1/2006 | Yagawa |
| 2006/0056626 A1 | 3/2006 | Keohane et al. |
| 2006/0064709 A1 | 3/2006 | Throckmorton et al. |
| 2006/0074954 A1 | 4/2006 | Hartline et al. |
| 2006/0080574 A1 | 4/2006 | Saito et al. |
| 2006/0095741 A1 | 5/2006 | Asher et al. |
| 2006/0107266 A1 | 5/2006 | Martin et al. |
| 2006/0117217 A1 | 6/2006 | Chien et al. |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2006/0190510 A1 | 8/2006 | Gabryjelski et al. |
| 2006/0272023 A1 | 11/2006 | Schmeidler et al. |
| 2007/0011472 A1 | 1/2007 | Cheng |
| 2007/0050479 A1 | 3/2007 | Yoneda |
| 2007/0079087 A1 | 4/2007 | Wang et al. |
| 2007/0101095 A1 | 5/2007 | Gorobets |
| 2007/0118657 A1 | 5/2007 | Kreitzer et al. |
| 2007/0124020 A1 | 5/2007 | Staples |
| 2007/0156842 A1* | 7/2007 | Vermeulen ........ G06F 17/30212 709/217 |
| 2007/0174362 A1 | 7/2007 | Pham et al. |
| 2007/0180294 A1 | 8/2007 | Kameyama et al. |
| 2007/0198789 A1 | 8/2007 | Clark et al. |
| 2007/0245331 A1 | 10/2007 | Daynes et al. |
| 2007/0250674 A1 | 10/2007 | Fineberg et al. |
| 2007/0266037 A1 | 11/2007 | Terry et al. |
| 2007/0282969 A1 | 12/2007 | Dietrich et al. |
| 2007/0283046 A1 | 12/2007 | Dietrich et al. |
| 2008/0033914 A1 | 2/2008 | Cherniack et al. |
| 2008/0059483 A1 | 3/2008 | Williams et al. |
| 2008/0068899 A1 | 3/2008 | Ogihara et al. |
| 2008/0109478 A1 | 5/2008 | Wada et al. |
| 2008/0118150 A1 | 5/2008 | Balakrishnan et al. |
| 2008/0120164 A1 | 5/2008 | Hassler |
| 2008/0168108 A1 | 7/2008 | Molaro et al. |
| 2008/0177697 A1 | 7/2008 | Barsness et al. |
| 2008/0189705 A1 | 8/2008 | Weinert et al. |
| 2008/0212225 A1* | 9/2008 | Ito .................. G11B 27/105 360/71 |
| 2008/0235485 A1 | 9/2008 | Haertel et al. |
| 2008/0285366 A1 | 11/2008 | Fujiwara |
| 2008/0294764 A1 | 11/2008 | Wakako |
| 2009/0013123 A1 | 1/2009 | Hsieh |
| 2009/0070537 A1 | 3/2009 | Cho |
| 2009/0083476 A1 | 3/2009 | Pua et al. |
| 2009/0094250 A1 | 4/2009 | Dhuse et al. |
| 2009/0113167 A1* | 4/2009 | Gamble ............. G06F 11/1451 711/216 |
| 2009/0132676 A1 | 5/2009 | Tu et al. |
| 2009/0150641 A1 | 6/2009 | Flynn et al. |
| 2009/0157700 A1 | 6/2009 | Van Vugt |
| 2009/0164506 A1 | 6/2009 | Barley et al. |
| 2009/0198889 A1 | 8/2009 | Ito et al. |
| 2009/0213487 A1 | 8/2009 | Luan et al. |
| 2009/0234883 A1 | 9/2009 | Hurst et al. |
| 2009/0240750 A1 | 9/2009 | Seo |
| 2009/0254572 A1 | 10/2009 | Redlich et al. |
| 2009/0265568 A1 | 10/2009 | Jackson |
| 2009/0300403 A1 | 12/2009 | Little |
| 2009/0319078 A1 | 12/2009 | Jackson |
| 2010/0017446 A1 | 1/2010 | Choi et al. |
| 2010/0037056 A1* | 2/2010 | Follis ................. G06F 11/1464 713/171 |
| 2010/0094819 A1 | 4/2010 | Bornhoevd et al. |
| 2010/0131792 A1 | 5/2010 | Herrod |
| 2010/0138764 A1 | 6/2010 | Hatambeiki et al. |
| 2010/0153941 A1 | 6/2010 | Borissov et al. |
| 2010/0169544 A1 | 7/2010 | Eom et al. |
| 2010/0217927 A1 | 8/2010 | Song et al. |
| 2010/0223259 A1 | 9/2010 | Mizrahi |
| 2010/0228711 A1 | 9/2010 | Li et al. |
| 2010/0235409 A1 | 9/2010 | Roy et al. |
| 2010/0242096 A1 | 9/2010 | Varadharajan et al. |
| 2010/0306267 A1 | 12/2010 | Zamkoff et al. |
| 2010/0318999 A1 | 12/2010 | Zhao et al. |
| 2010/0328528 A1 | 12/2010 | Eggert |
| 2010/0332751 A1 | 12/2010 | Quigley et al. |
| 2011/0022633 A1 | 1/2011 | Bernosky et al. |
| 2011/0026942 A1 | 2/2011 | Naito |
| 2011/0035757 A1 | 2/2011 | Comer |
| 2011/0055661 A1 | 3/2011 | Grube et al. |
| 2011/0058277 A1 | 3/2011 | de la Fuente et al. |
| 2011/0060775 A1 | 3/2011 | Fitzgerald |
| 2011/0078277 A1 | 3/2011 | Baptist |
| 2011/0078407 A1 | 3/2011 | Lewis |
| 2011/0099324 A1 | 4/2011 | Yeh |
| 2011/0161679 A1 | 6/2011 | Grube et al. |
| 2011/0191591 A1 | 8/2011 | Cheng et al. |
| 2011/0202929 A1 | 8/2011 | Schleimer et al. |
| 2011/0225209 A1 | 9/2011 | Volvovski et al. |
| 2011/0225417 A1 | 9/2011 | Maharajh et al. |
| 2011/0225426 A1 | 9/2011 | Agarwal et al. |
| 2011/0231597 A1 | 9/2011 | Lai et al. |
| 2011/0246716 A1 | 10/2011 | Frame et al. |
| 2011/0247074 A1 | 10/2011 | Manring et al. |
| 2011/0258630 A1 | 10/2011 | Fee et al. |
| 2011/0264717 A1 | 10/2011 | Grube et al. |
| 2011/0265143 A1 | 10/2011 | Grube et al. |
| 2011/0276656 A1 | 11/2011 | Knapp et al. |
| 2011/0282839 A1 | 11/2011 | Paksoy et al. |
| 2011/0289263 A1 | 11/2011 | McWilliams et al. |
| 2011/0289383 A1 | 11/2011 | Dhuse et al. |
| 2011/0296195 A1 | 12/2011 | Nakagawa et al. |
| 2011/0296440 A1 | 12/2011 | Launch et al. |
| 2011/0307657 A1 | 12/2011 | Timashev et al. |
| 2012/0011398 A1 | 1/2012 | Eckhardt et al. |
| 2012/0017096 A1 | 1/2012 | Snider |
| 2012/0030165 A1 | 2/2012 | Guirguis et al. |
| 2012/0030411 A1 | 2/2012 | Wang et al. |
| 2012/0079189 A1 | 3/2012 | Colgrove et al. |
| 2012/0079190 A1 | 3/2012 | Colgrove et al. |
| 2012/0079562 A1 | 3/2012 | Anttila et al. |
| 2012/0110150 A1 | 5/2012 | Kosuru et al. |
| 2012/0124654 A1 | 5/2012 | Senac |
| 2012/0137062 A1 | 5/2012 | Arges et al. |
| 2012/0143830 A1 | 6/2012 | Cormode et al. |
| 2012/0150528 A1 | 6/2012 | Upadhyaya et al. |
| 2012/0166576 A1 | 6/2012 | Orsini et al. |
| 2012/0173392 A1 | 7/2012 | Kirby et al. |
| 2012/0185437 A1 | 7/2012 | Pavlov et al. |
| 2012/0210092 A1 | 8/2012 | Feldman |
| 2012/0226933 A1 | 9/2012 | Baptist et al. |
| 2012/0233432 A1 | 9/2012 | Feldman et al. |
| 2012/0243687 A1 | 9/2012 | Li et al. |
| 2012/0254089 A1 | 10/2012 | Alba et al. |
| 2012/0254175 A1* | 10/2012 | Horowitz .......... G06F 17/30584 707/737 |
| 2012/0254690 A1 | 10/2012 | Resch et al. |
| 2012/0284719 A1 | 11/2012 | Phan et al. |
| 2012/0290539 A1 | 11/2012 | Bryant et al. |
| 2012/0297311 A1 | 11/2012 | Duggal |
| 2012/0306754 A1 | 12/2012 | Jeong |

(56) References Cited

U.S. PATENT DOCUMENTS

| | | |
|---|---|---|
| 2012/0306912 A1 | 12/2012 | Blanco et al. |
| 2012/0310878 A1 | 12/2012 | Vuksan et al. |
| 2012/0311260 A1 | 12/2012 | Yamagiwa et al. |
| 2012/0322422 A1 | 12/2012 | Frecks, Jr. et al. |
| 2012/0331088 A1* | 12/2012 | O'Hare ............... G06F 21/6227 709/214 |
| 2013/0007511 A1 | 1/2013 | Gaertner et al. |
| 2013/0029641 A1 | 1/2013 | Hickie |
| 2013/0046974 A1 | 2/2013 | Kamara et al. |
| 2013/0073600 A1 | 3/2013 | Jenkins et al. |
| 2013/0109371 A1 | 5/2013 | Brogan et al. |
| 2013/0145371 A1 | 6/2013 | Brunswig et al. |
| 2013/0151653 A1 | 6/2013 | Sawicki et al. |
| 2013/0191527 A1 | 7/2013 | Ashok et al. |
| 2013/0238932 A1 | 9/2013 | Resch |
| 2013/0254166 A1 | 9/2013 | Kottomtharayil |
| 2013/0275776 A1 | 10/2013 | Baptist et al. |
| 2013/0290263 A1 | 10/2013 | Beaverson et al. |
| 2013/0297964 A1 | 11/2013 | Hegdal et al. |
| 2013/0304711 A1 | 11/2013 | Resch |
| 2013/0325808 A1* | 12/2013 | Bachar ................. G06F 17/3023 707/640 |
| 2013/0326583 A1 | 12/2013 | Freihold et al. |
| 2014/0006401 A1* | 1/2014 | Levandoski ...... G06F 17/30339 707/737 |
| 2014/0006458 A1 | 1/2014 | Hsieh et al. |
| 2014/0006850 A1 | 1/2014 | Aliev et al. |
| 2014/0007214 A1 | 1/2014 | Qureshi et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0052706 A1 | 2/2014 | Misra et al. |
| 2014/0068208 A1 | 3/2014 | Feldman |
| 2014/0108421 A1 | 4/2014 | Isaacson et al. |
| 2014/0122572 A1 | 5/2014 | Finkelstein et al. |
| 2014/0137216 A1 | 5/2014 | Mohler |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0161123 A1 | 6/2014 | Starks et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0207680 A1 | 7/2014 | Rephlo |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0310792 A1 | 10/2014 | Hyland et al. |
| 2014/0344446 A1 | 11/2014 | Rjeili et al. |
| 2014/0351632 A1 | 11/2014 | Grube et al. |
| 2014/0351917 A1 | 11/2014 | Chickering |
| 2014/0372383 A1 | 12/2014 | Sipek |
| 2014/0380126 A1 | 12/2014 | Yekhanin et al. |
| 2015/0058473 A1 | 2/2015 | Grande |
| 2015/0082458 A1 | 3/2015 | Cooper et al. |
| 2015/0149870 A1 | 5/2015 | Kozat |
| 2015/0154111 A1 | 6/2015 | D'Abreu et al. |
| 2015/0169716 A1 | 6/2015 | Franklin et al. |
| 2015/0175333 A1 | 6/2015 | Richardson et al. |
| 2015/0256423 A1 | 9/2015 | Stearns |
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0350316 A1 | 12/2015 | Calder et al. |
| 2015/0350362 A1 | 12/2015 | Pollack et al. |
| 2015/0355974 A1 | 12/2015 | Hayes et al. |
| 2015/0356005 A1 | 12/2015 | Hayes et al. |
| 2016/0011816 A1 | 1/2016 | Aizman |
| 2016/0012617 A1 | 1/2016 | Maetz et al. |
| 2016/0034295 A1 | 2/2016 | Cochran |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0085797 A1 | 3/2016 | Patiejunas et al. |
| 2016/0092248 A1 | 3/2016 | Shani et al. |
| 2016/0179824 A1 | 6/2016 | Donlan et al. |
| 2016/0203477 A1 | 7/2016 | Yang et al. |
| 2016/0216991 A1 | 7/2016 | Ansari et al. |
| 2016/0283941 A1 | 9/2016 | Andrade |
| 2016/0335310 A1 | 11/2016 | Lahiri et al. |
| 2017/0024281 A1 | 1/2017 | Franklin et al. |
| 2017/0060687 A1 | 3/2017 | Franklin et al. |
| 2017/0123728 A1 | 5/2017 | Rungta |
| 2017/0180346 A1 | 6/2017 | Suarez et al. |
| 2017/0222814 A1 | 8/2017 | Oberhauser et al. |
| 2017/0235848 A1 | 8/2017 | Van Dusen et al. |
| 2017/0250801 A1 | 8/2017 | Chen et al. |
| 2017/0262697 A1 | 9/2017 | Kaps et al. |
| 2017/0293669 A1 | 10/2017 | Madhavan et al. |
| 2017/0295023 A1 | 10/2017 | Madhavan et al. |
| 2017/0331896 A1 | 11/2017 | Holloway et al. |
| 2018/0082256 A1 | 3/2018 | Tummuru et al. |

FOREIGN PATENT DOCUMENTS

| | | |
|---|---|---|
| CN | 101496005 A | 7/2009 |
| JP | H05113963 A | 5/1993 |
| JP | H06149739 A | 5/1994 |
| JP | H11259321 A | 9/1999 |
| JP | 2000023075 A | 1/2000 |
| JP | 2002278844 A | 9/2002 |
| JP | 2004531923 A | 10/2004 |
| JP | 2005122311 A | 5/2005 |
| JP | 2006526837 A | 11/2006 |
| JP | 2007299308 A | 11/2007 |
| JP | 2008299396 A | 12/2008 |
| JP | 2011043968 A | 3/2011 |
| JP | 5858506 B1 | 2/2016 |
| JP | 2016081134 A | 5/2016 |
| KR | 20020088574 A | 11/2002 |
| KR | 20070058281 A | 6/2007 |
| KR | 20130107383 A | 10/2013 |
| WO | 0227489 A2 | 4/2002 |
| WO | 02071382 A1 | 9/2002 |
| WO | 2014047073 A1 | 3/2014 |
| WO | 2016067295 A1 | 5/2016 |

OTHER PUBLICATIONS

Advanced Computer & Network Corporation, "RAID level 6: Independent Data Disks With Two Independent Parity Schemes", May 7, 2011, from https://web.archive.org/web/20110507215950/http://www.acnc.com/raidedu/6, 2 pages.

Amazon Web Services, "Amazon Elastic MapReduce Developer Guide," API Version Nov. 30, 2009, dated Jun. 12, 2012, retrieved on Jun. 22, 2015, from https://web.archive.org/web/20120612043953/http://s3.amazonaws.com/awsdocs/ElasticMapReduce/latest/emr-dg.pdf, 318 pages.

Amazon Web Services, "Amazon Glacier Developer Guide," API Version Jun. 1, 2012, dated Aug. 20, 2012, retrieved Jun. 22, 2015, from https://web.archive.org/web/20120908043705/http://awsdocs.s3.amazonaws.com/glacier/latest/glacier-dg-pdf, 209 pages.

Amazon Web Services, "Aws Import/Export Developer Guide," API Version Jun. 3, 2010, dated Jun. 12, 2012, retrieved Jun. 22, 2015, from https://web.archive.org/web/20120612051330/http://s3.amazonaws.com/awsdocs/ImportExpert/latest/AWSImportExport-dg.pdf, 104 pages.

Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.

Amer et al., "Design Issues for a Shingled Write Disk System," 26th IEEE Symposium on Massive Storage Systems and Technologies: Research Track (MSST 2010):1-12, May 2010.

(56) References Cited

OTHER PUBLICATIONS

Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.
Chen et al., "RAID: High-Performance, Reliable Secondary Storage," ACM Computing Surveys 1994, 26:145-185, retrieved on Jan. 11, 2016, from https://web.archive.org/web/20040721062927/http://meseec.ce.rit.edu/eecc722-fall2002/papers/io/3/chen94raid.pdf, 69 pages.
Cisco, "Cisco Standalone HDD Firmware Update Version 3.0—IBM Servers," Nov. 16, 2010, 5 pages.
Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.
Duan, "Research and Application of Distributed Parallel Search Hadoop Algorithm," 2012 International Conference on Systems and Informatics (ICSAI 2012), IEEE, May 19, 2012, pp. 2462-2465.
Firtman, "Programming the Mobile Web," 2d ed., O'Reilly Media, Inc., California, 2013, Chap. 8, "HTML5 Forms," pp. 235-275.
Gibson et al., "Directions for Shingled-Write and Two-Dimensional Magnetic Recording System Architectures: Synergies with Solid-State Disks (CMU-PDL-09-104)," Carnegie Mellon University Research Showcase, Parallel Data Laboratory, Research Centersand Institutes, pp. 1-3, May 1, 2009.
IEEE, "The Authoritative Dictionary of IEEE Standards Terms," Seventh Edition, 2000, p. 836.
International Search Report and Written Opinion dated Aug. 25, 2016, International Patent Application No. PCT/US2016/040510, filed Jun. 30, 2016.
International Search Report and Written Opinion dated Feb. 14, 2014, in International Patent Application No. PCT/US2013/053828, filed Aug. 6, 2013.
International Search Report and Written Opinion dated Feb. 14, 2014, International Patent Application PCT/US2013/053853, filed Aug. 6, 2013.
International Search Report and Written Opinion dated Mar. 6, 2014, in International Patent Application No. PCT/US2013/053852, filed Aug. 6, 2013.
Jacobs et al., "Memory Systems, Cache, DRAM, Disk," Copyright 2007, Morgan Kaufman, 9 pages.
Johansson et al., "Computing Device With Integrated Authentication Token," U.S. Appl. No. 14/572,739, filed Dec. 16, 2014.
Kozierok, "File Allocation Tables," The PC Guide, Apr. 17, 2001, retrieved Nov. 28, 2016, from http://www.pcguide.com/ref/hdd/file/fatFATs-c.html, 2 pages.
Massiglia, "The RAID Book: The Storage System Technology Handbook", 6th Edition, 1997, pp. 26-27, 84-91, 136-143, and 270-271.
Mcclintock et al., "Human Readable Mechanism for Communicating Binary Data," U.S. Appl. No. 14/470,886, filed Aug. 27, 2014.
Merriam-Webster, "Predetermine," Current Edition of Dictionary, retrieved Dec. 15, 2014, from www.merriam-webster.com/dictionary.
Micheloni et al., "Inside NAND Flash Memories," Springer First Edition (ISBN 978-90-481-9430-8):40-42, Aug. 2010.
Nielsen, "Stop Password Masking," Nielsen Norman Group, Jun. 23, 2009, http://www.useit.com/articles/stop-password-masking/ [retrieved Jul. 14, 2015], 2 pages.
Roos, "How to Leverage an API for Conferencing," Jan. 2012, from http://money.howstuffworks.com/businesscommunications/how-to-leverage-an-api-for-conferencing1.htm, 2 pages.
Rosenblum et al., "The Design and Implementation of a Log-Structured File System," University of California at Berkley, ACM Transactions on Computer Systems 10(1):26-52, Feb. 1992.
Seagate, "Firmware Updates for Seagate Products," Feb. 2012, retrieved from http://knowledge.seagate.com/articles/en US/FAQ/207931en, 1 page.
Storer et al., "POTSHARDS—A Secure, Recoverable, Long-Term Archival Storage System," ACM Transactions on Storage, Published Jun. 2009, vol. 5, No. 2, Article 5, pp. 5:1 to 5:35.
Wikipedia, "Checksum," from Wayback/Wikipedia at en.wikipedia.org/wiki/checksum, retrieved Mar. 2011, 5 pages.
Wikipedia, "Error Correction," from Wayback/Wikipedia.org at en.wikipedia.org/wiki/Error-correcting.sub.-code, retrieved Sep. 2010, 7 pages.
Wikipedia, "Hash Tree," from Wikipedia.org at http://en.wikipedia.org/wiki/Hash.sub.-tree, retrieved Jul. 12, 2012, 1 page.
Wikipedia, "Process identifier," dated Sep. 3, 2010, retrieved Jul. 9, 2015, from https://en.wikipedia.org/w/index.php?title=Process_identifier&oldid=382695536, 2 pages.
Wroblewski, "Showing Passwords on Log-In Screens," Lukew.com, Jan. 22, 2015, http://www.lukew.com/ff/entry.asp?1941 [retrieved Jul. 14, 2015], 11 pages.
Yu et al., "Exploiting sequential access when declustering data over disks and MEMS-based storage," Distributed and Parallel Databases vol./Issue 19(2-3):147-168, May 25, 2006.
Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.
European Office Action dated Nov. 6, 2018, Patent Application No. 16739357.8-1222, published May 9, 2018, 7 pages.
PC Plus, "How to turn an old netbook into a NAS drive," TechRadar, Mar. 1, 2010 [retreived Feb. 5, 2019], https://www.techradar.com/news/networking/routers-storage/how-to-turn-an-old-netbook-into-a-nas-drive-670757, 12 pages.
"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.
Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.
Franco, "Understanding Bitcoin: Cryptography, Engineering and Economics," Wiley, Nov. 24, 2014, 167 pages.
He et al., "Elastic Application Container: A Lightweight Approach for Cloud Resource Provisioning," 26th IEEE International Conference on Advanced Information Networking and Applications, Mar. 26, 2012, pp. 15-22.
IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112).
International Organization for Standardization/ International Electrotechnical Commission, "Information technology—Trusted Platform Module—Part 1: Overview," International Standard, ISO/IEC 11889-1(E), May 15, 2009, 20 pages.
International Organization for Standardization/International Electrotechnical Commission, "Information technology—Trusted Platform Module—Part 2: Design principles," International Standard, ISO/IEC 11889-2(E), May 15, 2009, 152 pages.
International Organization for Standardization/International Electrotechnical Commission, "Information technology—Trusted Platform Module—Part 3: Structures," International Standard, ISO/IEC 11889-3:2009(E), 204 pages.
International Organization for Standardization/International Electrotechnical Commission, "Information technology—Trusted Platform Module—Part 4: Commands," International Standard, ISO/IEC 11889-4:2009(E), 254 pages.
International Search Report and Written Opinion in International Patent Application No. PCT/US2015/050513, dated Feb. 16, 2016, 22 pages.
International Search Report and Written Opinion dated Nov. 22, 2017, International Patent Application No. PCT/US2017/054319, filed Sep. 29, 2017, 14 pages.
Kim, "How Sharding Works," Medium, Dec. 5, 2014 [retrieved Nov. 17, 2017], https://medium.com/@jeeyoungk/how-sharding-works-b4dec46b3f6, 12 pages.
Maccarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.

(56) References Cited

OTHER PUBLICATIONS

Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Soltesz et al., "Container-based operating system virtualization: a scalable, high-performance alternative to nypervisors," ACM SIGOPS Operating Systems Review 41(3):275-287, Mar. 2007.
Swan, "Blockchain: Blueprint for a New Economy," O'Reilly Media, Inc., Jan. 22, 2015, 144 pages.
Thiele et al., "Embedded Software in Network Processors—Models and Algorithms," Lecture Notes in Computer Science 2211:416-34, Oct. 8, 2001.
Third-Party Submission Under 37 CFR 1.290 dated Apr. 24, 2018, U.S. Appl. No. 15/283,017, filed Sep. 30, 2016, 10 pages.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Xavier et al., "Performance evaluation of container-based virtualization for high performance computing environments," Parallel, Distributed and Network-Based Processing (PDP), 2013 21st Euromicro International Conference, Feb. 2013, pp. 233-240.
Zhao et al., "Experimental study of virtual machine migration in support of reservation of cluster resources," Proceedings of the 2nd international workshop on Virtualization technology in distributed computing, Nov. 2007, pp. 1-8.
Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.
Australian Examination Report No. 1 dated Feb. 3, 2020, Patent Application No. 2017336924, filed Sep. 29, 2017, 4 pages.
International Search Report and Written Opinion dated Feb. 4, 2016, International Patent Application No. PCT/US2015/059983, 12 pages.
Japanese Decision to Grant a Patent dated Jun. 2, 2020, Patent Application No. 2019-516608, 1 page.
Japanese Notice of Reasons for Rejection dated Feb. 18, 2020, Patent Application No. 2019-516608, filed Sep. 29, 2017, 3 pages.
Singaporean Written Opinion dated May 14, 2020, Patent Application No. 11201902518S, 7 pages.
Wikipedia, "Docker (Software)," Jul. 21, 2016, retrieved Jul. 29, 2016, from http://en.wikipedia.org/wiki/Docker_software), 6 pages.
Wikipedia, "LXC," Jul. 6, 2016, retrieved Jul. 29, 2016, from http://en.wikipedia.org/wiki/LXC, 3 pages.

* cited by examiner

TECHNIQUES FOR VERIFIABLY PROCESSING DATA IN DISTRIBUTED COMPUTING SYSTEMS

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, has increased the importance of efficiently tracking various processing states for data stored and manipulated thereon. As systems scale to meet demand, they tend to become more widely distributed, and coordinating the various components of widely distributed systems becomes increasingly onerous, especially regarding processing that involves the irreversible deletion of data.

BRIEF DESCRIPTION OF THE DRAWINGS

Various techniques will be described with reference to the drawings, in which.

DETAILED DESCRIPTION

In the following description, various techniques will be described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In one example, an orchestrating entity, such as a deletion engine as described in further detail herein, is used to coordinate, and in some cases, directly perform various data processing operations across multiple layers of a multi-layer and/or distributed computing system. For example, in a data storage system that implements multiple disparate storage layers, a deletion engine is used to coordinate various processes and tasks across the storage layers so as to monotonically, verifiably delete data from the overall system. Due to the monotonic nature of the processes implemented and described herein, an observer, such as the deletion engine itself, may positively track and deduce the state of a given overall task (such as a deletion task) by determining the individual states of the subtasks of that task.

For example, a monotonic deletion process includes subtasks for deletion from a first storage layer (such as preliminary storage), a wait time for a determined period (e.g., to allow in-flight tasks to complete, such as those intended to remove Shannon entropy and/or volatility from the overall system), deletion from a second storage layer (such as volumes of durable storage), reclamation of storage space (such as from the durable storage volumes, after deletion), and removal of information relating to deletion requests associated with the data deleted (such as from a deletion table in a deletion store). The commission of these subtasks, such as by the deletion engine, is predicated on the verification of the subtask immediately preceding it. In some embodiments, the verifications are directly executed by the orchestrating entity, such as the deletion engine, so as to positively ensure the actual execution of the associated subtask.

While the examples provided in this disclosure describe the implementation of monotonic processes as they relate to multi-modal, multi-layer, and/or distributed data storage systems, these examples are not limiting. For example, monotonic processes may be implemented for other data processing routines used in distributed computing systems, such as computing resource service providers as further described herein.

Figure 1:
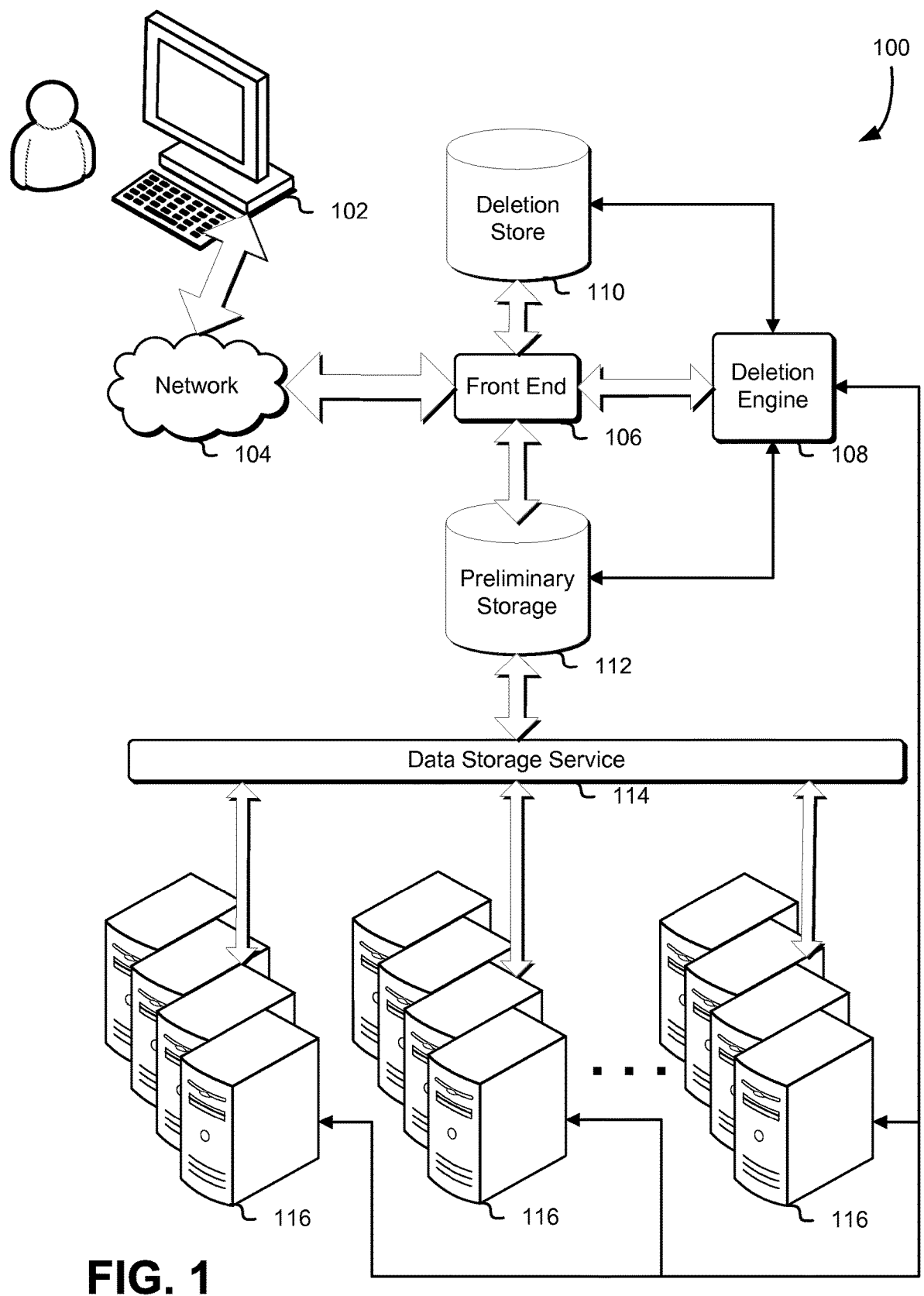
FIG. 1 illustrates an example environment in which a deletion engine orchestrates data deletion operations throughout a data storage system, including a data storage service, in accordance with some embodiments.

FIG. 1 illustrates an example environment 100 in which a deletion engine orchestrates data deletion operations throughout a data storage system, including a data storage service, in accordance with some embodiments. A customer device 102 connects, via a network 104, with the front end 106 of, e.g., a computing resource service provider providing a data storage service, so as to transact sets of data to be held in preliminary storage 112, and eventually stored on durable storage 116 associated with a data storage service 114. As may be contemplated, the customer device 102, or some other actor (such as that of the computing resource service provider), may also request deletion of one or more sets of data so stored. In such embodiments, information regarding the sets of data to be deleted is recorded in a deletion table, which may be stored in a deletion store 110. The recorded information may include the identity of the data to be deleted, the time at which the request was received, identity of the user (e.g., customer of the computing resource service provider) requesting the deletion and/or that of the data to be deleted, the identity of the data's location within durable storage (e.g., the identity of the volume(s) on which the data is presently stored), and the like. The deletions recorded in the table are orchestrated by the deletion engine 108, either synchronously with the request or asynchronously, depending on the implementation.

The customer device 102 may be any computing resource or collection of such resources enabling the customer to interface with the data storage system, such as in a programmatic fashion (e.g., via web service call or application programming interface call), and transact data therewith. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The network 104 may be a communication network, such as the Internet, an intranet or an Internet service provider (ISP) network. Some communications from the customer device 102 to the data storage system may cause the data storage system to operate in accordance with one or more embodiments described or a variation thereof. The front end 106 may be any entity capable of interfacing via a network 104 with a customer device 102, as well as various other components of a data storage system, so as to coordinate and/or direct data and requests to the appropriate entities. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The set of data may be produced by a program, process, application, module, service, or system associated with a computing resource service provider as described herein. The set of data may also be produced by a user or customer of the computing resource service provider, and submitted to the computing resource service provider via a customer device 102 and transmitted via a network 104. The set of data may include volatile data, which may be added to, changed, and/or deleted from in response to, for example, one or more requests (e.g., application programming interface requests or "API requests") made by the user or customer of the computer system. The set of data may also include non-volatile data (also referred to herein as "static data"), which may be at least partially unchanging as the one or more requests are received.

In an embodiment, the preliminary storage 112 is a data storage volume such as, for example, a magnetic disk drive (e.g., a spinning disk drive or a solid state disk drive), computer system memory, magnetic tape, or some other optical storage device. In another embodiment, the preliminary storage 112 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 112 described herein are illustrative examples and other types of data storage volumes used for the preliminary storage 112 may be considered as within the scope of the present disclosure.

In an embodiment, the preliminary storage 112 is a plurality of storage devices that are used to redundantly store the data using techniques such as, for example, bundle encoding, grid encoding, or replicated storage. For example, the preliminary storage 112 may store the data by distributing the data to a plurality of data shards (e.g., putting a first portion of the data in a first data shard and a second portion of the data in a second data shard) and generating one or more derived shards based on those data shards. In another embodiment, the preliminary storage 112 is one or more storage devices that store redundant copies of the data as received. In yet another embodiment, the preliminary storage uses a combination of the storage techniques described herein by, for example, storing a single copy of the data for a first time period (e.g., thirty minutes), storing multiple copies of the data for a second time period (e.g., one day), using redundant storage techniques such as grid or bundle encoding to store the data for a third time period (e.g., thirty days), and then moving the data to more durable storage 116 using the data storage service 114 as described herein.

The set of data may be stored in the preliminary storage 112 in an unaltered form (e.g., not processed, compressed, indexed, or altered prior to storage). The set of data may also be stored in the preliminary storage 112 as, for example, original data (also referred to herein as an "identity shard") such as the original data shards described herein. In an embodiment, the set of data stored in the preliminary storage 112 is stored without indexing and without any redundancy encoding. In another embodiment, the set of data stored in the preliminary storage 112 is stored with null redundancy encoding (i.e., a redundancy encoding that maps the data to itself). The data in preliminary storage may be stored as raw data, or may be bundle-encoded, or may be grid-encoded, or may be stored using some other method.

The preliminary storage 112 may have an associated durability that may be based on, for example, an annual failure rate ("AFR") of the data storage volume or the mapped data storage volume. For a given AFR, it may be assumed that the daily failure rate ("DFR") for the data storage volume or the mapped data storage volume is the AFR divided by three-hundred and sixty-five (i.e., the number of days in a year) and the hourly failure rate ("HFR") of the data storage volume or the mapped data storage volume is the DFR divided by twenty-four (i.e., the number of hours in a day). For example, if a data storage volume or the mapped data storage volume has an AFR of 2 percent, the data storage volume or the mapped data storage volume has a DFR of 0.0055 percent and an HFR of 0.00023 percent.

In some embodiments, the set of data is migrated from the preliminary storage 112 to a data storage service 114 for storage in a durable data storage system 116. In some of such embodiments, the migration may occur after a determined time period passes. The determined time period is selected so as to allow for the Shannon entropy of the system, e.g., keyed at least in part to the volatility or expected volatility of the set of the data, to decrease either on its own accord or via some active process (e.g., implemented by an entity of the computing resource service provider). For example, the determined time period may be based on the AFR, the DFR, and/or the HFR of the data storage volume or the mapped data storage volume, may be based on a desired durability of the data, may be based on the volatility of the data (e.g., the amount of changes in the data over the determined time period), or may be based on a combination of these and other such factors. In an embodiment, the volatility of the data (e.g., the amount of changes in the data over the determined time period) can be zero when, for example, the data does not change. Invariant data such as this may be migrated to durable storage more quickly than data that does change frequently. Conversely, data that does change frequently (e.g., highly volatile data) may not be migrated to durable storage at all and may, for example, be migrated to a different storage service as described herein, or simply remain in the preliminary storage 112. Accordingly, each data object of the subset of the set of data objects that is selected for migration may be selected based at least in part on the volatility of the data objects. In other words, each data object of the subset of the set of data objects that is selected for migration may be selected based at least in part on a corresponding number of changes made to the data object during a determined length of time. For example, the determined time period may be calculated based on a length of time that the data remains unchanged and/or is not accessed. In some embodiments, the system may, after a maximum upper bound of time, migrate the data, regardless of the state of the data at that time.

In an embodiment, data can be migrated from preliminary storage to the data storage service 112 as a result of an event such as, for example, a request by a customer to store the data in the data storage service 114. Other events may also be used to cause the migration of the data from preliminary storage 112 to the data storage service 114 such as, for example, events generated by a process, module, service, or application associated with the customer or associated with a computing resource service provider. In an illustrative example, a block storage service may maintain data storage in preliminary storage for a running virtual machine instance and, upon termination of the instance, may generate an event to migrate some or all of the data from preliminary storage to durable storage. The triggering event that causes the migration of data from preliminary storage may also be combined with an elapsed time as described above so that, for example, data may be stored in preliminary storage until an event occurs, but the data may also be migrated from preliminary storage if no event occurs prior to the elapsed time. As may be contemplated, the criteria for initiating the migration from preliminary storage described herein are illustrative examples and other such criteria for initiating the migration from preliminary storage may be considered as within the scope of the present disclosure.

As used herein, the durability of a data object may be understood to be an estimate of the probability that the data object will not unintentionally become permanently irretrievable (also referred to herein as "unavailable"). This durability is an estimated probability and is generally expressed as a percentage (e.g., 99.9999 percent). This durability is based on assumptions of probabilities of certain failures (e.g., the AFR of drives used to store the data) and may be based on an average failure rate, a maximum failure rate, a minimum failure rate, a mean failure rate, or some other such failure rate. The durability may be based on a statistical average of the failure over a collection of drives when there are many different drives and/or when there are many different types of drives. The durability may also be based on historical measurements of the failure of drives and/or statistical sampling of the historical measurements of the failure of drives. The durability may also be correlated with the probability that a data object will not unintentionally become unavailable such as, for example, basing the durability on the probability that a data object will unintentionally become unavailable. As may be contemplated, the methods of determining durability of data described herein are merely illustrative examples and other such methods of determining durability of data may be considered as within the scope of the present disclosure.

When the data is migrated or otherwise stored on the data storage service 114, the data storage service 114 may store the data using one or more redundancy encoding techniques such as those described herein. For example, the data storage service 114 may encode the data by producing one or more data shards and may store the one or more data shards on one or more volumes of a set of volumes of durable storage 116 configured to store the redundancy encoded data as described herein. Depending on the redundancy encoding technique used by the data storage service 114, some or all of the shards stored may consist entirely of original data (identity shards) or derived data (derived shards). In some embodiments, the shards may be apportioned on a one-to-one basis to the volumes 116 of the durable storage. Accordingly, in such embodiments, some volumes may include directly readable, original data (identity shards), while others contain only derived data (derived shards).

It should be noted that, as used herein, the durability of data and/or data storage may be separate from the redundancy of the data in the data storage. For example, data stored in preliminary storage 112 may be highly durable (i.e., have a very low failure rate) but may not be redundant if, for example, it is stored as a single copy. Conversely, data stored using one or more redundancy encoding techniques such as those described herein and while such data may be less durably stored (i.e., may have fewer "9's" of durability), it may be highly redundant. For example, data stored in a grid may have no fewer than four separate copies of the data (one of the data shard, one from the horizontally-derived shards, one from the vertically-derived shards, and one from the remaining shards). If the grid is geographically distributed into, for example, multiple datacenters, the data may have greater redundancy due to the added tolerance for loss of a complete datacenter.

During or after the storage process just described, a customer, through the customer device 102, may request deletion of sets of data. As may be contemplated, due to the distributed and, in some cases, asynchronous nature of the individual storage transitions, migrations, and subtasks involved in the example system described, a deletion engine 108 is employed to orchestrate the deletion process. In some embodiments, the deletion process is monotonic—that is, the process is implemented such that each subtask of the process is concretely dependent on the verified completion of the preceding subtask, such that the process can only either move forward from one subtask to the next, or stay in a given state while executing a subtask, but never revert back to a preceding subtask. Combined with the implementation of positive verification of the completion of each subtask, a multi-layer, multi-modal, and/or distributed data storage system such as the one described is afforded a deletion process where the individual storage layers, components, etc., are fully coordinated such that the risk of state collision, state conflicts, etc. related to the deletion process and the data being deleted is minimal.

In connection with receiving the deletion request, a deletion table that may, for example, be stored in a deletion store 110, is updated with information regarding the data to be deleted. The recorded information may include the identity of the data to be deleted, the time at which the request was received, identity of the user (e.g., customer of the computing resource service provider) requesting the deletion and/or that of the data to be deleted, the identity of the data's location within durable storage (e.g., the identity of the volume(s) on which the data is presently stored), and the like.

Either synchronously with the request (or the recording of the deletion in the deletion table), or asynchronously therewith (e.g., at some point thereafter), the deletion engine 108 begins processing the deletions recorded in the deletion table. In some embodiments, the deletions recorded in the deletion table are queued in an ordered queue, and the deletion engine 108 processes the deletions in the order prescribed by the queue. In some embodiments, an entity of the computing resource service provider, such as the deletion engine 108 itself, sorts and batches the deletion requests to improve efficiency. In some of such embodiments, the deletion requests are batched so that the eventual deletion from one of the storage entities, e.g., the volumes 116 of the durable storage, is coordinated with respect to the data to be deleted. For example, the data deletion requests are batched and sorted such that the deletion engine processes a plurality of data deletions for data durably stored in a given volume in one batch. As may be contemplated, the batching and sorting may be adjusted, either statically or dynamically, depending on the layering or other structure of the overall system in which the deletion process is implemented, as well as various performance aspects such as throughput, latency, system load, and the like. Furthermore, it is contemplated that in some embodiments, batching may occur without sorting, while in other embodiments, sorting may occur without batching.

The deletion engine 108 may be any computing resource or collection of such resources capable of interacting with other components of the computing resource service provider, so as to orchestrate and execute the deletion process as implemented. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., via application programming interface calls, web service calls, or other programmatic methods), databases (which may be implemented on one or more of the foregoing examples), and the like.

The deletion store 110 may be any computing resource or collection of such resources capable of storing information related to stored data, such as a deletion table identifying data to be deleted, and either storing and/or interfacing with one or more resources to provide that information regarding the deleted data to other entities, such as the deletion engine, or other components of the computing resource service provider, such as the volumes of the data storage service. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., via application programming interface calls, web service calls, or other programmatic methods), databases (which may be implemented on one or more of the foregoing examples), and the like.

The deletion engine 208 may, for example, orchestrate a monotonic deletion process which includes subtasks for deletion from a first storage layer (such as preliminary storage 112), a wait time for a determined period (e.g., to allow in-flight tasks to complete, such as those intended to remove Shannon entropy and/or volatility from the overall system), deletion from a second storage layer (such as volumes of durable storage 116), reclamation of storage space (such as from the durable storage volumes 116, after deletion), and removal of information relating to deletion requests associated with the data deleted (such as from a deletion table in the deletion store 110). The commission of these subtasks, such as by the deletion engine 108, is predicated on the verification of the subtask immediately preceding it. In some embodiments, the verifications are directly executed by the orchestrating entity, such as the deletion engine 108, so as to positively ensure the actual execution of the associated subtask. The deletion process is described in further detail below.

Figure 2:
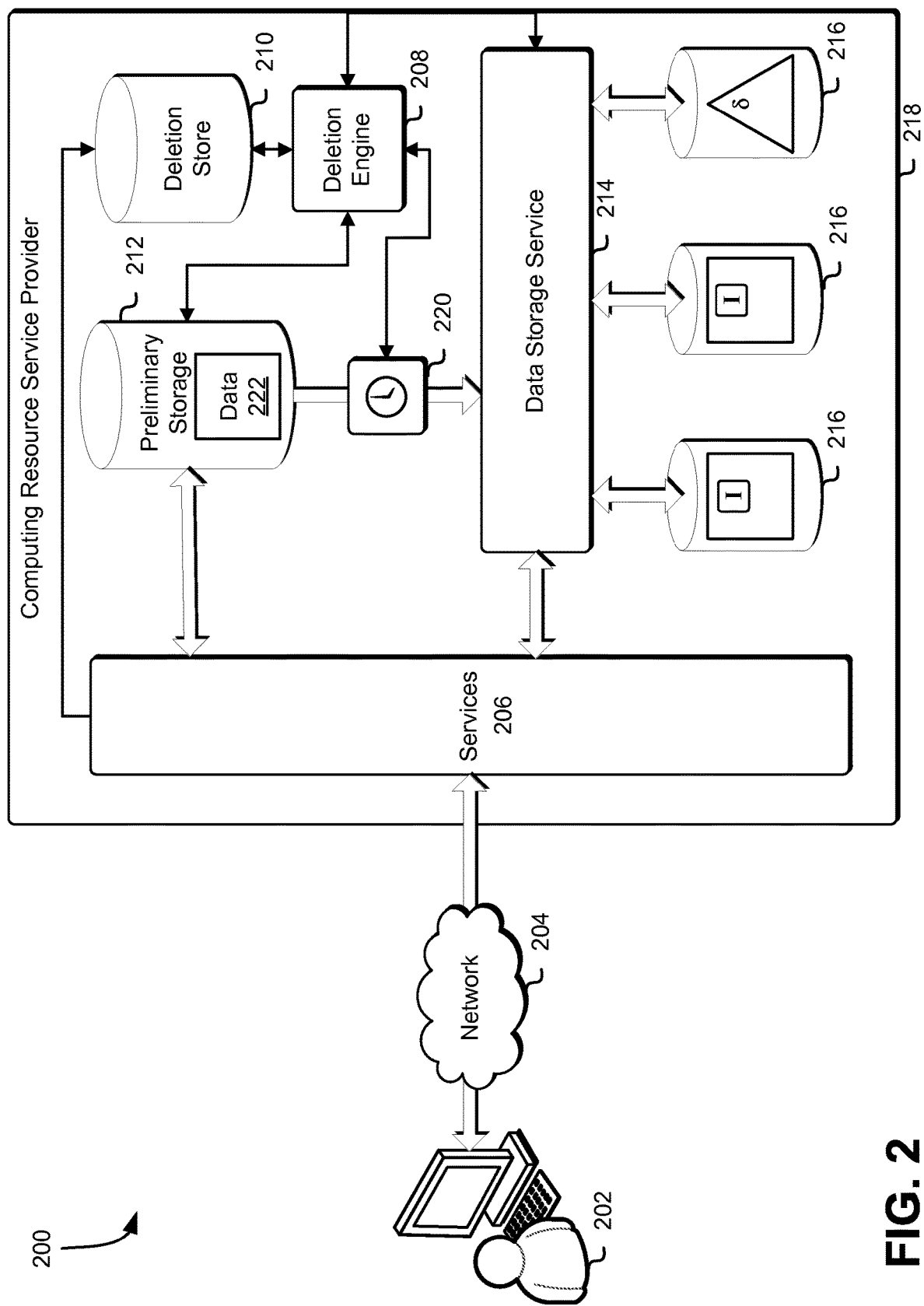
FIG. 2 illustrates an example environment in which a computing resource service provider implements a deletion store and a deletion engine to coordinate deletion and storage operations for data transacted therewith, in accordance with some embodiments.

FIG. 2 illustrates an example environment 200 in which a computing resource service provider implements a deletion store and a deletion engine to coordinate deletion and storage operations for data transacted therewith, in accordance with some embodiments.

A customer, via a customer device 202, may connect via a network 204 to one or more services 206 provided by a computing resource service provider 218. In some embodiments, the computing resource service provider 218 may provide a distributed, virtualized and/or datacenter environment within which one or more applications, processes, services, virtual machines, and/or other such computer system entities may be executed. In some embodiments, the customer may be a person, or may be a process running on one or more remote computer systems, or may be some other computer system entity, user, or process. The customer device 202 and the network 204 may be similar to that described in connection with at least FIG. 1 above.

The command or commands to connect to the computer system instance may originate from an outside computer system and/or server, or may originate from an entity, user, or process on a remote network location, or may originate from an entity, user, or process within the computing resource service provider, or may originate from a user of the customer device 202, or may originate as a result of an automatic process or may originate as a result of a combination of these and/or other such origin entities. In some embodiments, the command or commands to initiate the connection to the computing resource service provider 218 may be sent to the services 206, without the intervention of the user of the services 206. The command or commands to initiate the connection to the services 206 may originate from the same origin as the command or commands to connect to the computing resource service provider 218 or may originate from another computer system and/or server, or may originate from a different entity, user, or process on the same or a different remote network location, or may originate from a different entity, user, or process within the computing resource service provider, or may originate from a different user of the customer device 202, or may originate as a result of a combination of these and/or other such same and/or different entities.

The customer device 202 may request connection to the computing resource service provider 218 via one or more connections and, in some embodiments, via one or more networks 204 and/or entities associated therewith, such as servers connected to the network, either directly or indirectly. The customer device 202 that requests access to the services 206 may, as previously discussed, include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network 204, also as previously discussed, may include, for example, a local network, an internal network, a public network such as the Internet, or other networks such as those listed or described herein. The network may also operate in accordance with various protocols such as those listed or described herein.

The computing resource service provider 218 may provide access to one or more host machines as well as provide access to services such as virtual machine (VM) instances, automatic scaling groups, or file-based database storage systems as may be operating thereon. The services 206 may connect to or otherwise be associated with one or more storage services such as those described herein (e.g., the data storage service 214). The storage services may be configured to provide data storage for the services 206. In an embodiment, the computing resource service provider 218 may provide direct access to the one or more storage services for use by users and/or customers of the computing resource service provider. The storage services may manage storage of data on one or more block storage devices and/or may manage storage of data on one or more archival storage devices such as, for example, magnetic tapes.

For example, the computing resource service provider 218 may provide a variety of services 206 to the customer device 202, which may in turn communicate with the computing resource service provider 218 via an interface, which may be a web service interface, application programming interface (API), user interface, or any other type of interface. The services 206 provided by the computing resource service provider 218 may include, but may not be limited to, a virtual computer system service, a block-level data storage service, a cryptography service, an on-demand data storage service, a notification service, an authentication service, a policy management service, an archival storage service, a durable data storage service such as the data storage service 214, and/or other such services. Each of the services 206 provided by the computing resource service provider 218 may include one or more web service interfaces that enable the customer device 202 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service or the data storage service 214, and/or to access one or more block-level data storage devices provided by the block-level data storage service).

The block-level data storage service may comprise one or more computing resources that collectively operate to store data for a user using block-level storage devices (and/or virtualizations thereof). The block-level storage devices of the block-level data storage service may, for example, be operationally attached to virtual computer systems provided by a virtual computer system service to serve as logical units (e.g., virtual drives) for the computer systems. A block-level storage device may enable the persistent storage of data used or generated by a corresponding virtual computer system where the virtual computer system service may be configured to only provide ephemeral data storage.

The computing resource service provider 218 may also include an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user to retrieve or perform other operations in connection with the data objects stored by the on-demand data storage service.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

The services 206 may produce data, such as data received from the customer device 202, that may be stored 222 in the preliminary storage 212 as described above. In some embodiments, as previously mentioned, the data stored in the preliminary storage may be stored in unaltered form, such as in an identity shard. While the data is stored in the preliminary storage 212, the data 222 may be accessed by the services 206 (e.g., as a result of one or more API requests by the customer device 202) from the preliminary storage 212. After a determined period 220, such as described above in connection with FIG. 1, has passed and the data is migrated to a data storage service 214 provided by the computing resource service provider 218, the data may be accessed using the data storage service 214. In an embodiment where the data may be stored using redundancy encoding technique such as those described herein, the data storage service 214 may retrieve the data from any of the data volumes 216 and/or may reconstruct the data using the redundancy encoding techniques. The data volumes 216 may be magnetic tape, may be optical disks, or may be some other such storage media. As previously discussed and as further discussed herein, the data may be stored in identity shards that correspond individually to volumes, and may also be processed (using the redundancy encoding techniques) so as to create derived shards.

The data storage service 214 may store the data 222 in the preliminary storage 212 or may transmit a command that causes a different service (e.g., a block storage service or some other storage service such as those described herein) to store the data 222 in the preliminary storage 212. The data storage service 214 may also cause the data to be migrated from the preliminary storage 212 or may transmit a command that causes a different service to cause the data to be migrated from the preliminary storage 212. The data storage service 214 may also transmit a command or commands to cause a different service to perform other operations associated with making data objects eventually durable including, but not limited to, storing the data objects in the data shards, calculating derived shards, updating bundles, updating grids (i.e., updating horizontal, vertical, and other bundles of multiply bundled data), and/or other such operations.

In an embodiment, a separate service can be configured to monitor the elapsed time associated with the data objects in preliminary storage 212 and, based on a desired durability, cause the data storage service 214 to cause the data to be migrated from the preliminary storage 212 to the durable storage by, for example, transmitting a message to the data storage service. This separate service may operate asynchronously to enforce time limits for all such data stored in preliminary storage.

As previously discussed in connection with at least FIG. 1, a deletion store 210 may be used to record information, such as in a deletion table, regarding data to be deleted in the overall system, such as associated data 222 resident in preliminary storage 212, stored in durable storage (volumes) 216 of data storage service 214, or both. Using, for example, monotonic deletion processes as further described herein, the deletion engine 208 interacts with various entities of the computing resource service provider 218, such as the preliminary storage 212, the deletion store 210, the data storage service 214 (and in some embodiments directly with volumes 216), and so on, so as to orchestrate and control the overall deletion processes. In some embodiments, as described herein, the deletion engine 208 may wait for a determined period 220 so as to allow for processes related to the data to complete in, e.g., the data storage service 214 (and associated volumes 216).

Figure 3:
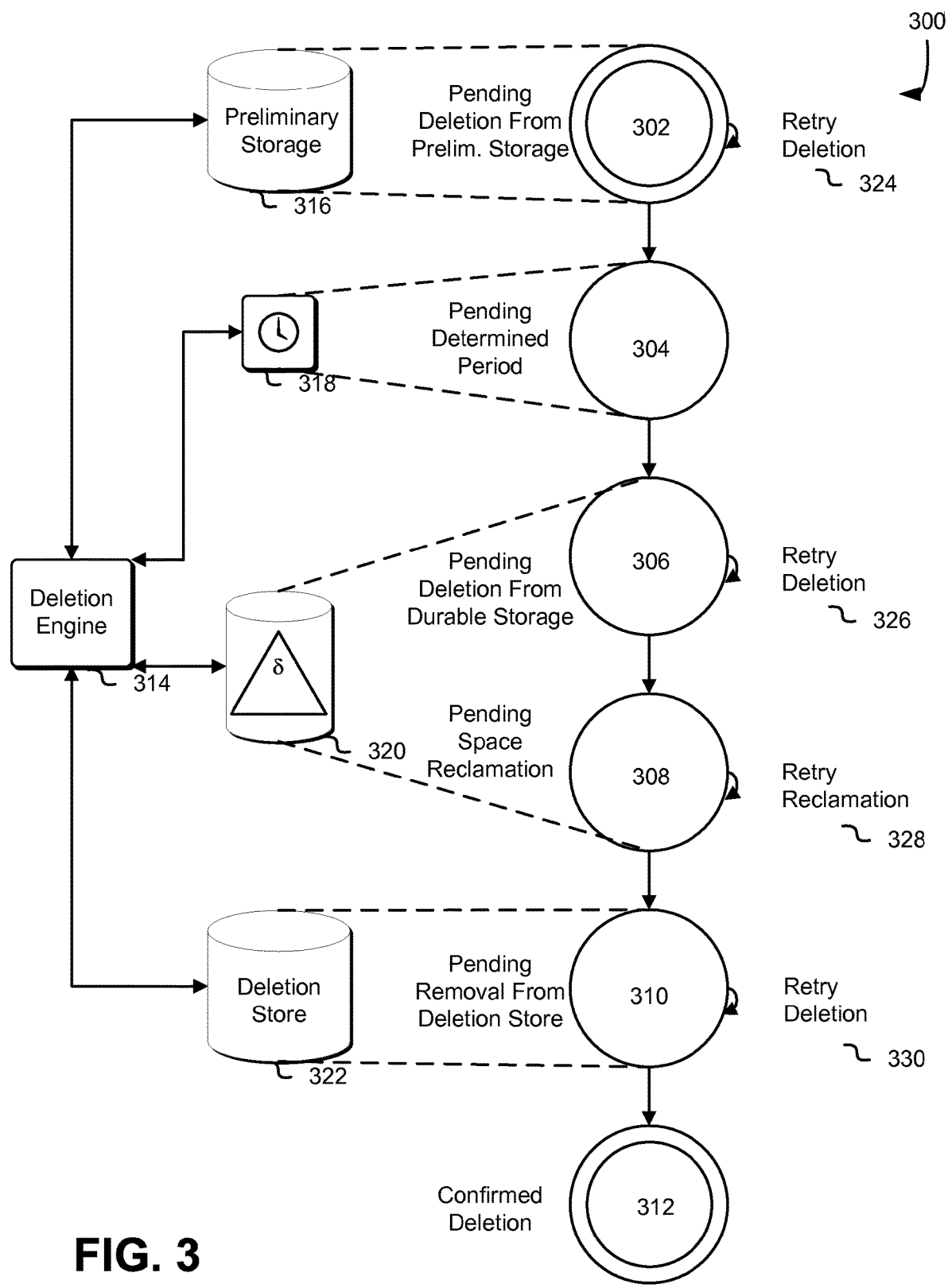
FIG. 3 illustrates an example state machine for processing data deletions on a distributed data storage system, in accordance with some embodiments.

FIG. 3 illustrates an example state machine 300 for processing data deletions on a distributed data storage system, in accordance with some embodiments. As mentioned, deletion engine 314, interacts with various entities of the computing resource service provider, such as the preliminary storage 316, the deletion store 322, the volumes 320 of the data storage service, and so on, so as to orchestrate and control the subtasks of the deletion process. In some embodiments, as described herein, the deletion engine 314 may wait for a determined period 320 so as to allow for processes related to the data to complete in, e.g., the data storage service (and associated volumes 322).

As mentioned, the deletion process may be monotonic—that is, the process is implemented such that each subtask of the process is concretely dependent on the verified completion of the preceding subtask, such that the process can only either move forward from one subtask to the next, or stay in a given state while executing a subtask, but never revert back to a preceding subtask. Combined with the implementation of positive verification of the completion of each subtask, a multi-layer, multi-modal, and/or distributed data storage system such as the one described is afforded a deletion process where the individual storage layers, components, etc., are fully coordinated such that the risk of state collision, state conflicts, etc. related to the deletion process and the data being deleted is minimal. An example state machine for an example deletion process is illustrated in FIG. 3, and described herein.

After initiation, such as by drawing one or more deletion jobs/requests from a queue as previously described, the deletion engine 314 may, for example, cause the deletion of the associated data from a first storage layer, such as from preliminary storage 316. The preliminary storage may directly verify the deletion of the data by, for example, directly inquiring as to the existence of the data in question after submitting the deletion subtask to the preliminary storage 316. In an alternative embodiment, the deletion engine 314 may directly delete the data from the preliminary storage 316, such as by bypassing in-built processes of the preliminary storage 316 for such deletions. To the extent that the deletion from the preliminary storage is unsuccessful or cannot be verified, the deletion is retried 324, either immediately (or otherwise synchronously), or asynchronously, by either the same entity of the deletion engine 314 or a different entity (such as a different computing resource). As may be contemplated, by virtue of serializing the deletion subtasks/actions described herein, and not attempting further steps (or retrying predecessor steps) of the deletion process, each step is idempotent—that is, for a given action (e.g., delete data set X from preliminary storage bucket Y), any number of repeated requests by any number of actors will not affect the outcome of that step or subtask. Furthermore, the prerequisites for further steps are ensured as fulfilled prior to moving to the next step.

After the deletion from preliminary storage 316 is verified, the deletion process is temporarily halted for a determined period 304, for reasons previously discussed. For example, the deletion process may be suspended for the determined period 304 so as to allow time for processes intended to decrease entropy (e.g., Shannon entropy) in the data storage system and/or the preliminary storage to complete (e.g., an implemented wait time while volatility of data stored in preliminary storage 316 decreases to a certain value before migrated to the volumes 320 of the data storage system). In embodiments where the deletion process is halted for the determined period 318, migration tasks may be assumed as complete after that determined period 318 before moving on to the next subtask, so as to ensure that all data that would exist in the volumes 320 after the migration would have properly propagated to those volumes 320.

After the determined period 318, the deletion engine deletes or causes the deletion of data from the durable storage 320 at state 306. Again, the deletion engine may either rely on in-built functionality of the data storage service or the volumes 320 to do so, or, in alternate embodiments, may attempt to directly delete the data from the volumes 320 in question. In embodiments where the deletion engine relies on the in-built routines of the volumes 320 to delete the data, in some of such embodiments, the deletion engine may first query the volumes 320 to determine whether relevant data is actually extent within the volumes, and only initiate the in-built deletion routines of the volumes 320 that actually have the relevant data to be deleted. The deletion engine 314 verifies that the data is either non-existent or has been verifiably removed from all volumes relevant to the data deleted before moving on to the next state. To the extent that the deletion fails, it is retried 326 until the deletion state is consistent across all relevant volumes 320.

After the data is verified as deleted from the durable storage 320, the deletion engine reclaims or causes the reclamation of storage space from the durable storage 320 at state 308, so as to allow for new data to be written to the volumes 320 in the reclaimed space. Again, the deletion engine may either rely on in-built functionality of the data storage service or the volumes 320 to do so, or, in alternate embodiments, may attempt to directly reclaim the space from the volumes 320 in question. For example, the data storage service may directly issue erase commands to the storage devices of the volumes (e.g., physically, in the case of magnetic tape, logically, in the case of hard disk drives, or by using a TRIM command in the case of solid state devices). The deletion engine 314 verifies that the space has been reclaimed in all volumes relevant to the data deleted before moving on to the next state. To the extent that the space reclamation fails, it is retried 328 until the reclamation state is consistent across all relevant volumes 320.

After the space in the volumes 320 has been verifiably reclaimed, the relevant records are removed from the deletion table, e.g., as stored in the deletion store 322, at state 310. As with the other subtasks/actions described, the deletion engine 314 may directly remove such records or cause the records to be removed from the deletion store by issuing a command for the deletion store 322 to do so of its own accord. The removal of the deletion information is verified by the deletion engine 314, and to the extent that is unsuccessful, the removal is retried 330 until the information can be verified as removed. When the deletion information removal is complete, the entire process is confirmed by the deletion engine 314 as complete at state 312. In some embodiments, a confirmation of the completed deletion process is provided to a requestor, such as to the customer device or user initiating the pertinent deletion requests, or to other entities of the computing resource service provider.

As the deletion engine 314 tracks each subtask described, in some embodiments, the deletion engine 314 is capable of providing updates regarding the state of the deletion process, such as by direct inquiry (e.g., via API). If the deletion engine 314 becomes unavailable, and a status update is required but not available, as the described deletion process is monotonic, a different actor may deduce the deletion state simply by inquiring with each of the components described as to whether the data exists in those components. For example, if a requestor or other actor is informed that a deletion request was submitted for a set of data, and can ascertain that the data does not exist in either preliminary storage 316 or any of the volumes 320, but does still have records of deletion information in the deletion table on the deletion store, the requestor or other actor can deduce that the deletion process was not completed and furthermore can simply pick up where the process left off, and still have assurance that the overall deletion process is complete once the removal of the deletion information is complete.

Figure 4:
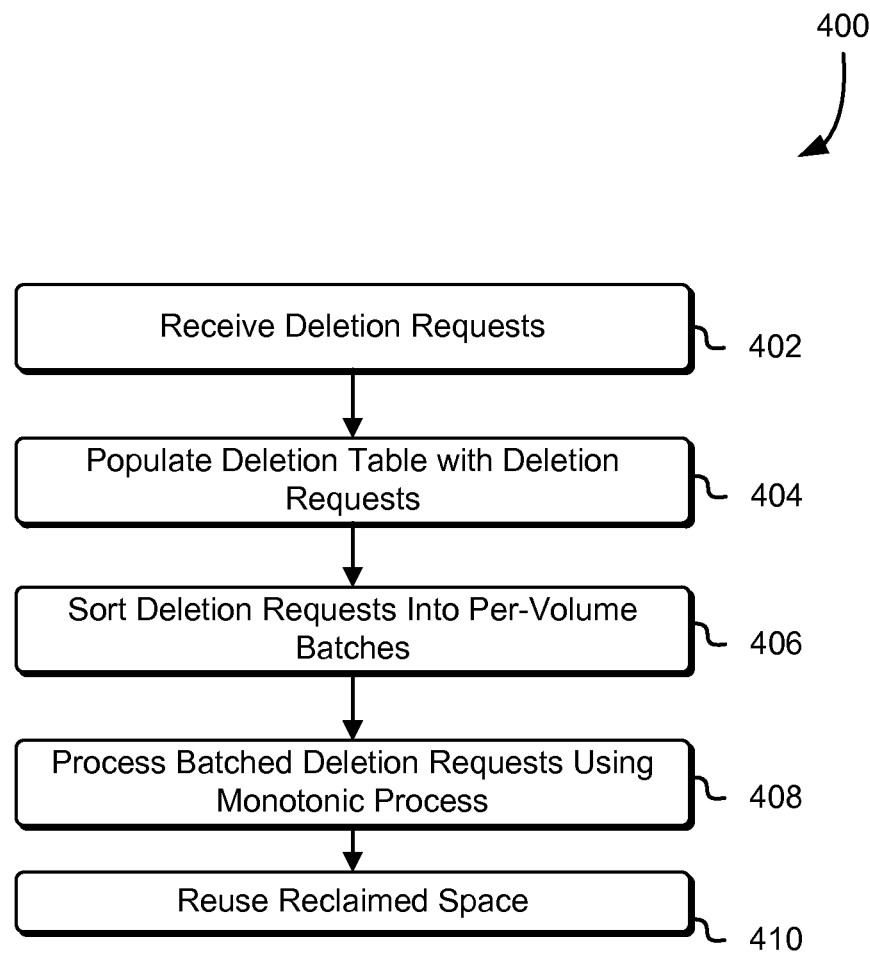
FIG. 4 illustrates an example process for processing deletion requests to reclaim space on a distributed data storage system, in accordance with some embodiments.

FIG. 4 illustrates an example process 400 for processing deletion requests to reclaim space on a distributed data storage system, in accordance with some embodiments. At step 402, an entity, such as one or more services of a computing resource service provider as described throughout this disclosure, receives deletion requests for data stored on a data storage system that is available via, for example, a data storage service. The deletion requests are entered into a deletion table, such as stored on a deletion store as described above, at step 404, and may, as previously discussed include information regarding the identity of the data to be deleted, the requestor, the owner of the data, volumes on which the data is stored, and the like.

At step 406, in some embodiments asynchronously (e.g., after a certain number of deletion requests are recorded), and in other embodiments synchronously with respect to the deletion requests (e.g., if they are highly batched), the requests are sorted by, e.g., a deletion engine or other entity of the computing resource service provider, into per-volume batches and queued for processing at step 406. The queue may provide assurances as to the order of processing relative to the time the deletion requests enter the queue.

At step 408, an entity, such as a deletion engine, processes the batched, queued deletion requests, using a monotonic process, such as that described in connection with at least FIGS. 3 and 5. As previously discussed, the process is monotonic in the sense that it can only move forward through states or stay in a given state, but stays consistent across multiple entities (such as those in a distributed system) in that the previous state is never entered once a given state is entered. Once the monotonic deletion process of step 408 is complete, and the space is reclaimed in the fashion previously described, the space reclaimed is reused at step 410 for other purposes, such as further storage of data, in a manner consistent with the techniques described throughout this disclosure.

Figure 5:
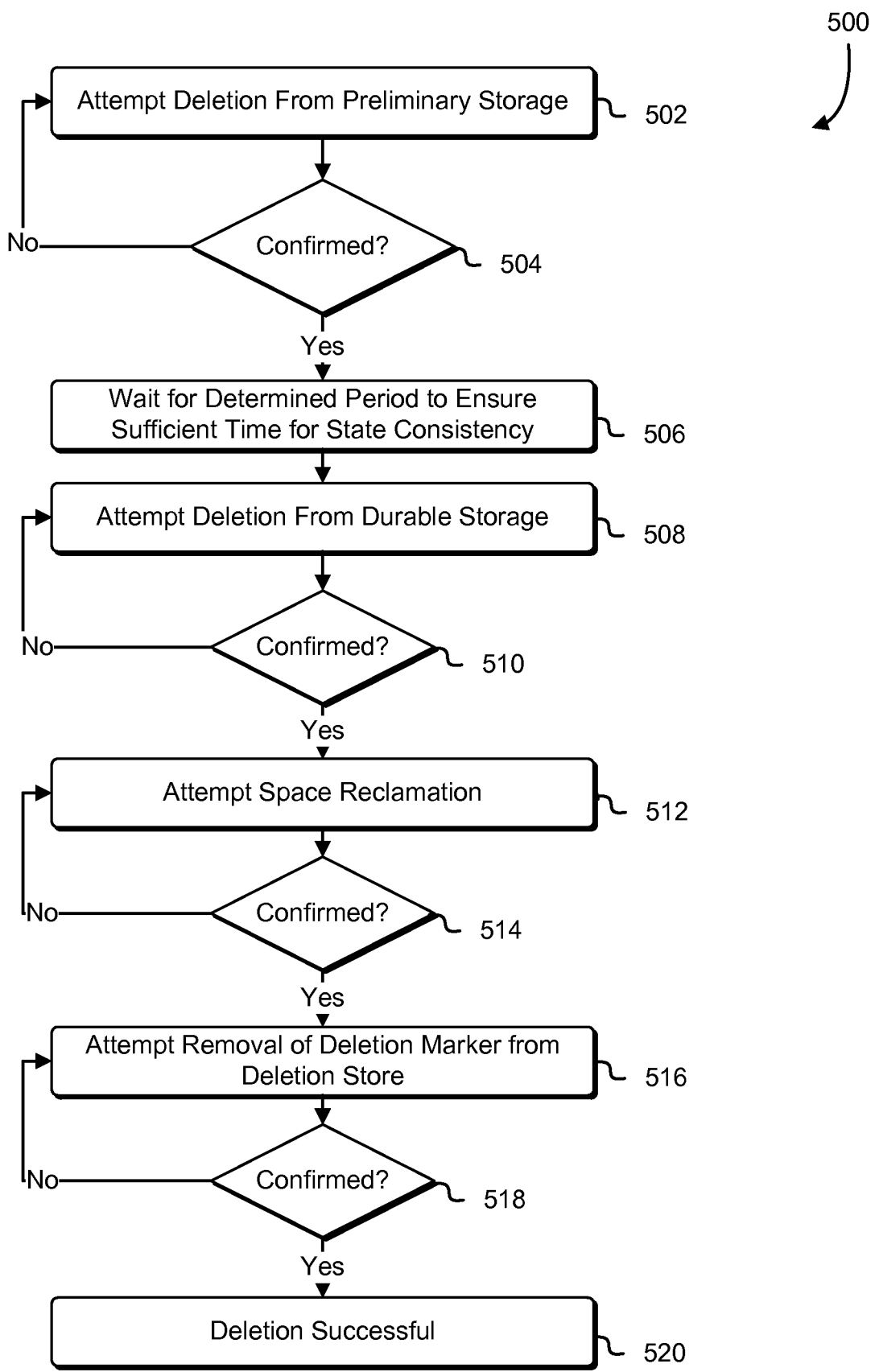
FIG. 5 illustrates an example process for monotonically processing deletion requests across disparate components of a distributed data storage system, in accordance with some embodiments.

FIG. 5 illustrates an example process for monotonically processing deletion requests across disparate components of a distributed data storage system, in accordance with some embodiments. After initiation of process 500, such as by drawing one or more deletion jobs/requests from a queue as previously described, a deletion engine may, for example, cause the deletion of the associated data from a first storage layer, such as from preliminary storage, at step 502. As previously mentioned, the preliminary storage may directly verify the deletion of the data by, for example, directly inquiring as to the existence of the data in question after submitting the deletion subtask to the preliminary storage. To the extent that the deletion from the preliminary storage is unsuccessful or cannot be verified at decision point 504, the deletion is retried, either immediately (or otherwise synchronously), or asynchronously, by either the same entity of the deletion engine or a different entity (such as a different computing resource). As may be contemplated, by virtue of serializing the deletion subtasks/actions described herein, and not attempting further steps (or retrying predecessor steps) of the deletion process, each step is idempotent—that is, for a given action (e.g., delete data set X from preliminary storage bucket Y), any number of repeated requests by any number of actors will not affect the outcome of that step or subtask.

If the deletion from preliminary storage is confirmed at decision point 504, the deletion process is temporarily halted for a determined period at step 506, so as to ensure state consistency in the system. For example, the deletion process may be suspended for a determined period so as to allow time for processes intended to decrease entropy (e.g., Shannon entropy) in the data storage system and/or the preliminary storage to complete (e.g., an implemented wait time while volatility of data stored in preliminary storage decreases to a certain value before migrated to the volumes of the data storage system). In embodiments where the deletion process is halted for the determined period, migration tasks may be assumed as complete after that determined period before moving on to the next subtask, so as to ensure that all data that would exist in the volumes after the migration would have properly propagated to those volumes.

After waiting for the determined period at step 506, the deletion engine deletes or causes the deletion of data from the durable storage at step 508. As mentioned, the deletion engine may either rely on in-built functionality of the data storage service or the volumes to do so, or, in alternate embodiments, may attempt to directly delete the data from the volumes in question. In embodiments where the deletion engine relies on the in-built routines of the volumes to delete the data, in some of such embodiments, the deletion engine may first query the volumes to determine whether relevant data is actually extent within the volumes, and only initiate the in-built deletion routines of the volumes that actually have the relevant data to be deleted.

At decision point 510, the deletion engine verifies whether the data is either non-existent or has been verifiably removed from all volumes relevant to the data deleted before moving on to the next state. To the extent that the deletion fails, it is retried until the deletion state is consistent across all relevant volumes. If the data is verified as deleted from the durable storage at decision point 510, the deletion engine reclaims or causes the reclamation of storage space from the durable storage at state 512, so as to allow for new data to be written to the volumes in the reclaimed space. As mentioned, the deletion engine may either rely on in-built functionality of the data storage service or the volumes to do so, or, in alternate embodiments, may attempt to directly reclaim the space from the volumes in question.

At decision point 514, the deletion engine verifies whether the space has been reclaimed in all volumes relevant to the data deleted before moving on to the next state. To the extent that the space reclamation fails, it is retried until the reclamation state is consistent across all relevant volumes. If the space in the volumes has been verifiably reclaimed, the relevant deletion markers (e.g., records) are removed from the deletion table, e.g., as stored in the deletion store, at step 516. As with the other subtasks/actions described, the deletion engine may directly remove such records or cause the records to be removed from the deletion store by issuing a command for the deletion store to do so of its own accord.

At decision point 518, the removal of the deletion information is verified by the deletion engine, and to the extent that is unsuccessful, the removal is retried until the information can be verified as removed. If the deletion information removal is confirmed complete, the entire process is confirmed by the deletion engine as complete at step 520. In some embodiments, a confirmation of the completed deletion process is provided to a requestor, such as to the customer device or user initiating the pertinent deletion requests, or to other entities of the computing resource service provider.

Figure 6:
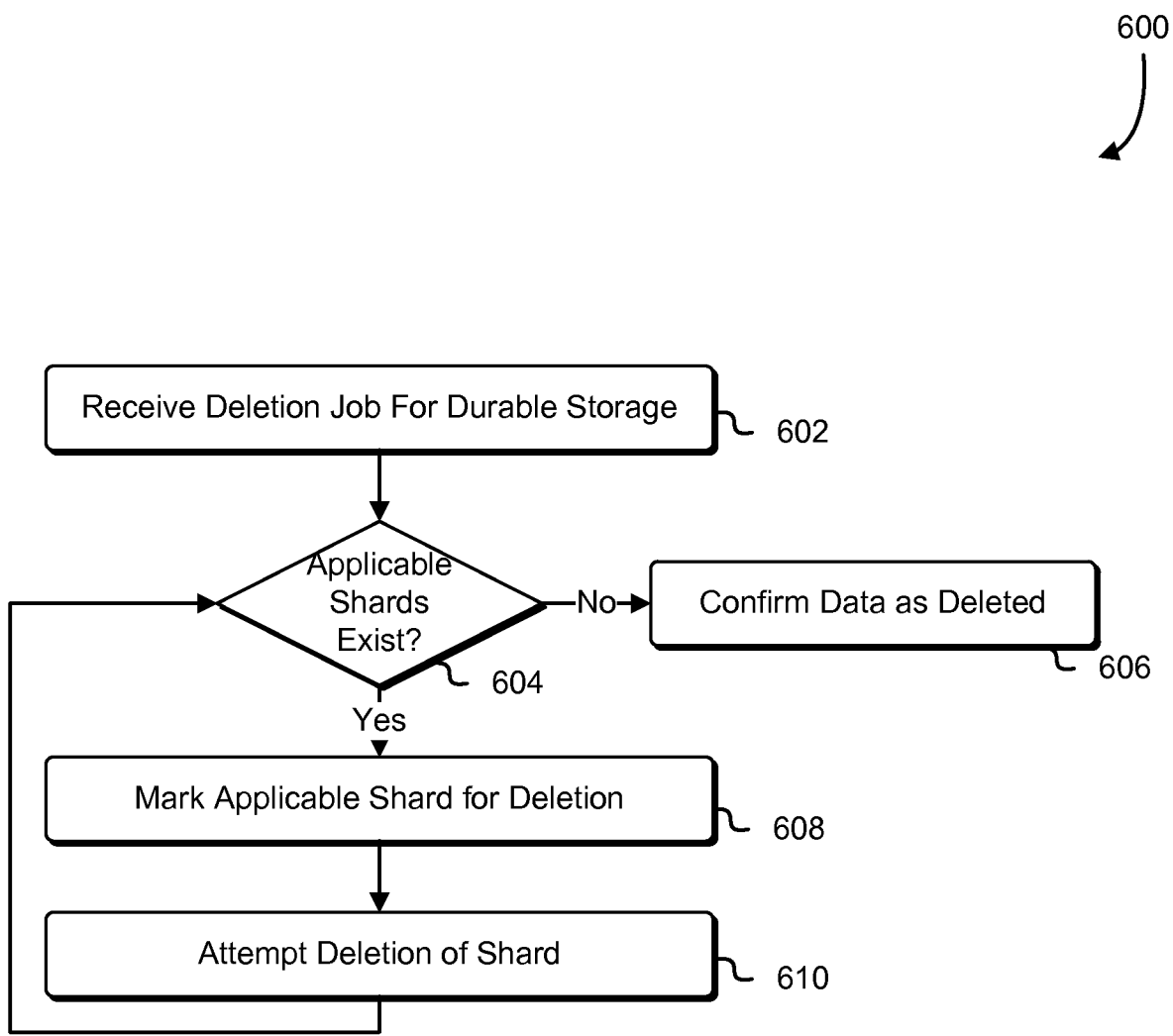
FIG. 6 illustrates an example process for efficiently marking deletions within volumes of durable storage in the context of a monotonic deletion process, in accordance with some embodiments.

FIG. 6 illustrates an example process 600 for efficiently marking deletions within volumes of durable storage in the context of a monotonic deletion process, in accordance with some embodiments. At step 602, one or more volumes receives a deletion job, or subtask, incident to a monotonic deletion process as previously discussed, which may be generated by a deletion engine, also as previously discussed. At decision point 604, a deletion engine, or possibly the volumes themselves, determine whether relevant data (e.g., shards) is actually extant within the volumes. To the extent data and/or shards exist on a given volume, no further deletion action is taken, and the data on that particular volume can be deemed as complete or confirmed 606. If, at decision point 604, the data does exist, in-built deletion routines of the volumes may be initiated, such as by marking that shard or portion thereof for deletion within the applicable volumes at step 608. At some point in time, either synchronously or asynchronously with the marking action at step 608, the shard is deleted 610, either by the volumes themselves or directly by the deletion engine.

Figure 7:
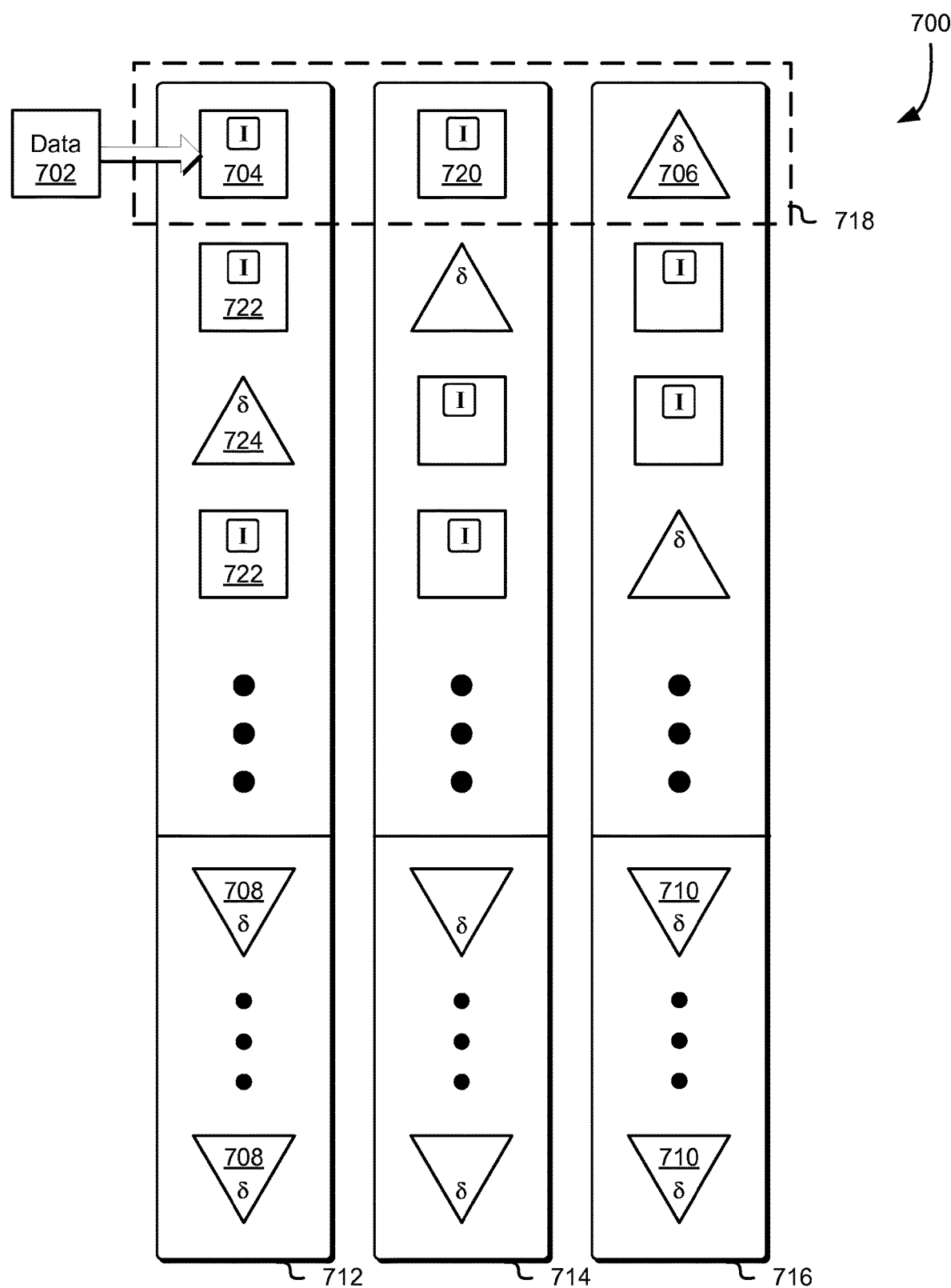
FIG. 7 illustrates an example environment where a redundancy encoding technique is applied to data stored in durable storage in accordance with at least one embodiment.

FIG. 7 illustrates an example environment 700 where a redundancy encoding technique is applied to data stored in durable storage as described in connection with FIG. 1 and in accordance with an embodiment. The redundancy encoding technique illustrated in FIG. 7 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 7, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR", which is incorporated by reference herein.

In the example illustrated in FIG. 7, data 702 from preliminary storage is provided for storage in durable storage using a redundancy encoding technique with both horizontal derived shards and vertical derived shards. In the example illustrated in FIG. 7, a first datacenter 712 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 712. A second datacenter 714, which may be geographically and/or logically separate from the first datacenter 712, may also contain data shards, horizontal derived shards, and/or vertical derived shards. A third datacenter 716, which may be geographically and/or logically separate from the first datacenter 712 and from the second datacenter 714, may also contain data shards, horizontal derived shards, and/or vertical derived shards. As illustrated in FIG. 7, each of the three datacenters may be a single vertical bundle. In an embodiment, each of the datacenters can include multiple vertical bundles. As may be contemplated, the number of datacenters illustrated in FIG. 7 and/or the composition of the datacenters illustrated in FIG. 7 are merely illustrative examples and other numbers and/or compositions of datacenters may be considered as within the scope of the present disclosure. The datacenters may be co-located or may be located in one or more separate datacenter locations.

In the example illustrated in FIG. 7, the data 702 may be copied to a data shard 704 and, as a result of the change to the data in the data shard 704, a horizontal derived shard 706 associated with the data shard 704 may be updated so that the horizontal derived shard 706 may be used to reconstruct the data shard 704 in the event of a loss of the data shard 704. In the example illustrated in FIG. 7, the three shards enclosed by the dotted line (e.g., the data shard 704, the data shard 720, and the horizontal derived shard 706) are a horizontal bundle 718. In this example, the data shard 720 is not affected by the changes to the data shard 704 but the horizontal derived shard 706 may need to be updated as a result of the changes to the data shard 704.

Also as a result of the change to the data in the data shard 704, one or more vertical derived shards 708 related to the data shard 704 may also be updated so that the vertical derived shards 708 may be used to reconstruct the data shard 704 in the event of a loss of the data shard 704 and the horizontal derived shard 706. In the example illustrated in FIG. 7, the shards in datacenter 712 form a vertical bundle. In this example, the other data shards 722 in the vertical bundle and/or the horizontal derived shards 724 in the vertical bundle are not affected by the changes to the data shard 704 but the vertical derived shards 708 may need to be updated as a result of the changes to the data shard 704. Finally, as a result of the change to the horizontal derived shard 706, one or more vertical derived shards 710 related to the horizontal derived shard 706 in the vertical bundle in datacenter 716 may also be updated so that the vertical derived shards 710 may be used to reconstruct the horizontal derived shard 706 in the event of a loss of the horizontal derived shard 706 and the data shard 704.

Figure 8:
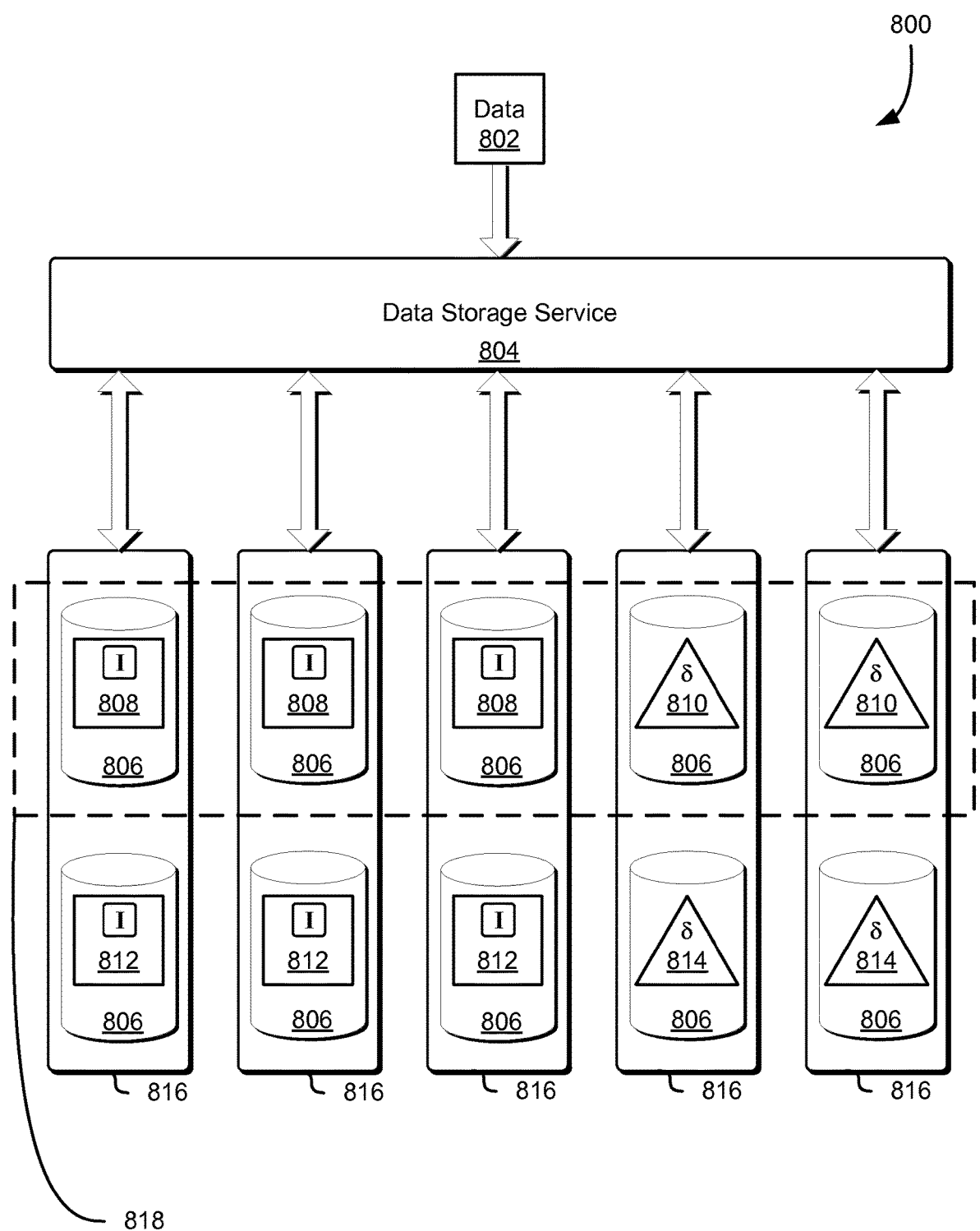
FIG. 8 illustrates an example environment where a redundancy encoding technique is applied to data stored in durable storage in accordance with at least one embodiment.

FIG. 8 illustrates an example environment 800 where a redundancy encoding technique is applied to data stored in durable storage as described in connection with FIG. 1 and in accordance with at least one embodiment. The redundancy encoding technique illustrated in FIG. 8 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS," which is incorporated by reference herein.

Data 802 from preliminary storage may be sent to a data storage system 804 for redundant storage. The data 802 may be provided from the preliminary storage by any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 804 via application programming interface calls, web service calls, or other programmatic methods), and the like.

The data storage system 804 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 804 via application programming interface calls, web service calls, or other programmatic methods), and the like. In some embodiments, the resources of the data storage system 804, as well as the data storage system 804 itself, may be one or more resources of a computing resource service provider, such as that described in further detail below. In some embodiments, the data storage system 804 and/or the computing resource service provider provides one or more archival storage services and/or data storage services, such as those described herein, through which a client entity may provide data such as the data 802 for storage in preliminary storage and/or the data storage system 804.

Data 802 may include any quantity of data in any format. For example, the data 802 may be a single file or may include several files. The data 802 may also be encrypted by, for example, a component of the data storage system 804 after the receipt of the data 802 in response to a request made by a customer of the data storage system 804 and/or by a customer of computing resource service provider.

The data storage system 804 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 804), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 804, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 804. For example, a data storage system 804 may generate a dense index for archives over a specified size (as the size of the index itself may be small relative to the number of archives stored on a given volume), and may also generate a sparse index for archives under that specified size (as the ratio of index size to archive size increases).

The data storage system 804 is connected to or includes one or more volumes 806 on which archives or identity shards may be stored. The generated indices for the archives may also be stored on the one or more volumes 806. The volumes 806 may be any container, whether logical or physical, capable of storing or addressing data stored therein. In some embodiments, the volumes 806 may map on a one-to-one basis with the data storage devices on which they reside (and, in some embodiments, may actually be the data storage devices themselves). In some embodiments, the size and/or quantity of the volumes 806 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 806, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 806.

In some embodiments, the sparse indices are used in connection with information relating to the sort order of the archives so as to locate archives without necessitating the use of dense indices, for example, those that account for every archive on a given volume. Such sort order-related information may reside on the volumes 806 or, in some embodiments, on an entity separate from the volumes 806, such as in a data store or other resource of a computing resource service provider. Similarly, the indices may be stored on the same volumes 806 to which they apply, or, in some embodiments, separately from such volumes 806.

The archives may be stored, bit for bit (e.g., the "original data" of the archives), on a subset of the plurality of volumes 806. Also as mentioned, appropriate indices may also be stored on the applicable subset of the plurality of volumes 806. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 8 illustrates five volumes, three of which contain original data archives 808 and two of which contain derived data 810, such as redundancy encoded data. In the illustrated example, the redundancy code used may require any three shards to regenerate original data, and therefore, a quantity of three volumes may be used to write the original data (even prior to any application of the redundancy code).

The volumes 806 bearing the original data archives 808 may each contain or be considered as shards unto themselves. For example, the data 802 from preliminary storage may be copied directly only to a volume if, as described herein, it is stored in preliminary storage as an identity shard. In embodiments where the sort order-related information and/or the indices are stored on the applicable volumes 806, they may be included with the original data of the archives and stored therewith as shards, as previously mentioned. In the illustrated example, the original data archives 808 are stored as three shards (which may include the respective indices) on three associated volumes 806. In some embodiments, the original data archives 808 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 808 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 8, the five volumes 806 include three volumes that have shards (e.g., identity shards) corresponding to the original data of the original data archives 808, while two have encoded shards corresponding to the derived data 810 (also referred to herein as "derived shards"). As illustrated in FIG. 8, the three original data archives 808, and the two encoded shards corresponding to the derived data 810 form a bundle 818 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 806 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 804, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 804 may locate, based on information regarding the sort order of the archives as stored on the volumes 806, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 804 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 804 may first determine the size of the requested archive, and if the requested archive is larger than or equal to the aforementioned size boundary, the dense index may be used so as to more quickly obtain the precise location of the requested archive.

In some embodiments, the volumes 806 may be grouped such that each given volume has one or more cohorts 816. In such embodiments, a volume set (e.g., all of the illustrated volumes 806) may be implemented such that incoming archives to be stored on the volumes are apportioned to one or more failure-decorrelated subsets of the volume set. The failure-decorrelated subsets may be some combination of the volumes 806 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 816). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 808 and/or original data archives 812), while others store derived data (e.g., derived data 810 and derived data 814). The data storage system 804 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 808 and derived data 810, while others are apportioned to volumes in a different pattern as shown by original data archives 812 and derived data 814. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 9:
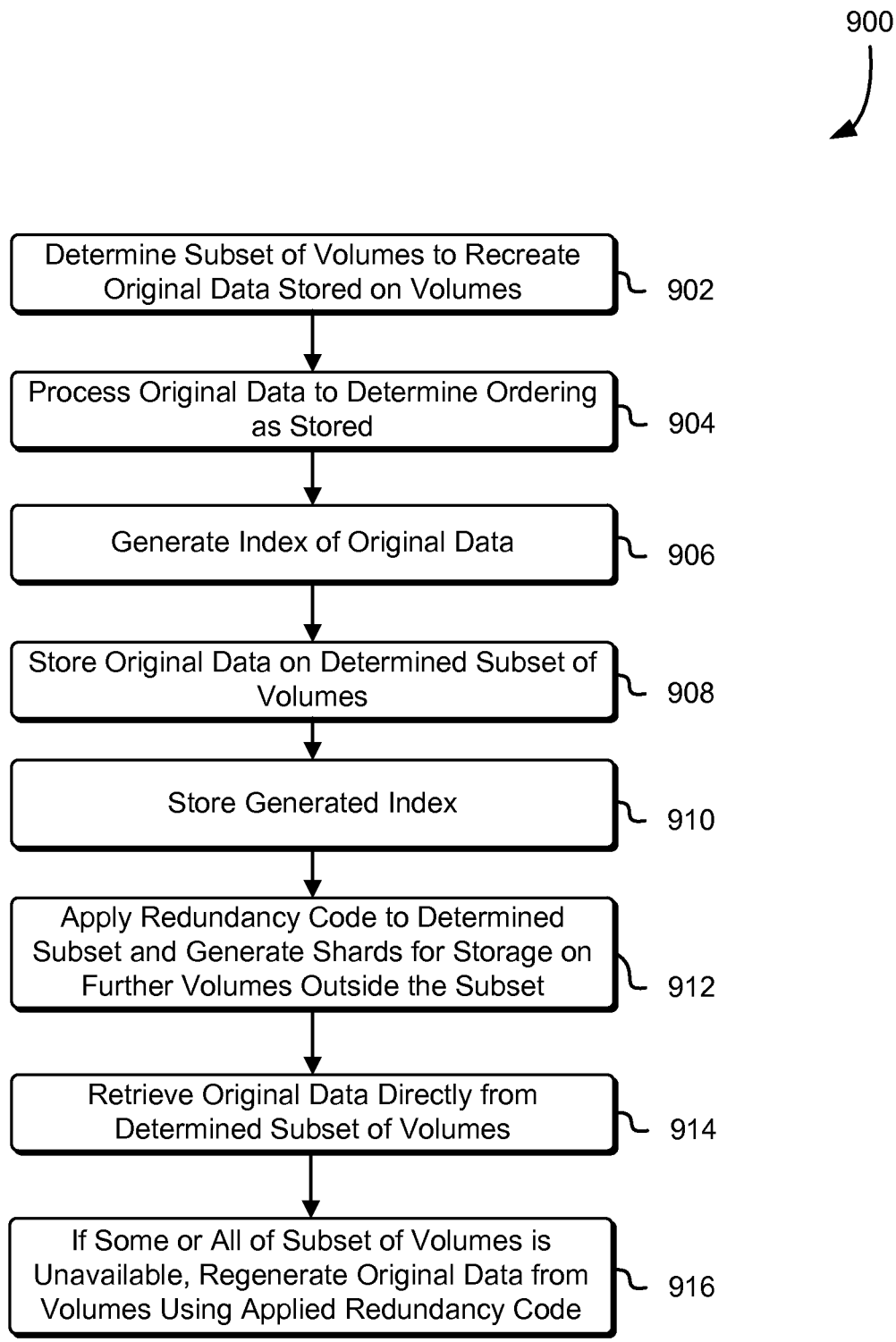
FIG. 9 illustrates an example process for applying redundancy encoding techniques to data stored in durable storage in accordance with at least one embodiment.

FIG. 9 illustrates an example process 900 for applying redundancy encoding techniques to data stored in durable storage as described herein in connection with FIG. 1 and in accordance with at least one embodiment. The example process 900 illustrated in FIG. 9 illustrates the processing, indexing, storing, and retrieving of data stored on a data storage system. The data may be retrieved from preliminary storage as described herein. The example process 900 illustrated in FIG. 9 may be used in conjunction with a grid encoding technique such that described in connection with FIG. 7, in conjunction with a bundle encoding technique such as that described in connection with FIG. 8, or with some other redundancy encoding technique. A data storage service such as the data storage service 112 described in connection with FIG. 1 may perform the example process 900 illustrated in FIG. 9.

At step 902, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 8, such information may be derived from predetermining the parameters of an erasure code with a specified ratio of shards that may be used to regenerate the original data from which they derive to the total number of shards generated from the application of the erasure code.

At step 904, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 906, one or more indices, such as sparse indices, are generated by, for example, the data storage system, for the original data. For example, there may be more than one index for a given volume, and such parallel indices may be of different types depending on the nature of the archives and/or original data being stored.

At step 908, the original data is stored, for example, by the data storage system, on the subset of volumes determined in connection with step 902, and in the order determined in step 904. Additionally, at step 910, the index generated in step 906 is stored, for example, by the data storage system, on an appropriate entity. For example, the index may be stored as part of a shard on which the original data is stored, or, in some embodiments, may be stored on a separate resource from that which persists the volume.

At step 912, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 902. For example, the ratio of volumes (e.g., shards as previously described herein) storing the original data to the overall quantity of volumes (including those storing the derived data generated in this step 912) may be prescribed by the recovery/encoding ratio of the redundancy code applied herein.

At step 914, in normal operation, requested data may be retrieved, for example, by the data storage system, directly from the subset of volumes storing the original data, without necessitating retrieval and further processing (e.g., by the redundancy code) from the volumes storing the derived data generated in step 912. However, at step 916, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 10:
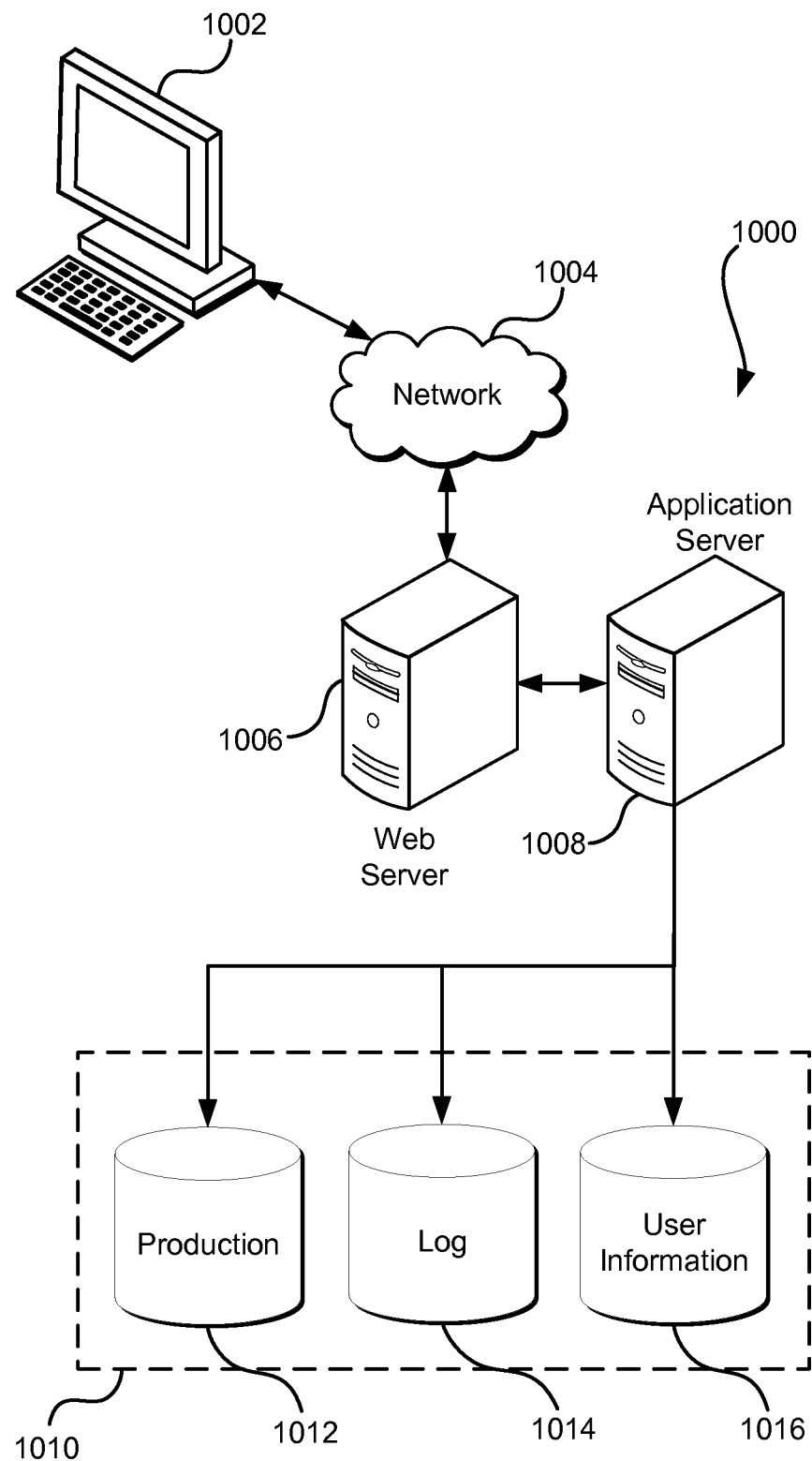
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
 in response to receiving deletion requests, recording, in a table of a deletion store, deletion information for data associated with the deletion requests for deletion, the data being stored on a plurality of disparate storage layers, the plurality of disparate storage layers including at least preliminary storage in a first storage layer and durable storage in a second storage layer, the durable storage including a plurality of volumes;

sorting the deletion requests so as to group the deletion requests into volume groups, the volume groups associated with one or more volumes of the plurality of volumes on which the data is stored; and processing, for each volume group of the volume groups using a monotonic deletion routine so as to delete the data of a respective volume group from the plurality of disparate storage layers, the monotonic deletion routine comprising:

deleting the data of the associated volume group from the preliminary storage;

verifying that the data of the respective volume group is deleted from the preliminary storage;

as a result of verifying that the data of the respective volume group is deleted from the preliminary storage, waiting for a determined period;

as a result of waiting for the determined period, deleting the data of the associated volume group from a respective volume associated with the respective volume group of the plurality of volumes;

verifying that the data of the respective volume group is deleted from the respective volume;

as a result of verifying that the data of the respective volume group is deleted from the respective volume, reclaiming space on the respective volume;

verifying that the space on the respective volume is reclaimed;

as a result of verifying that the space on the respective volume is reclaimed, removing the deletion information for the data of the respective volume group from the table;

verifying that the deletion information is removed from the table; and as a result of verifying that the deletion information is removed, confirming that the monotonic deletion routine is complete.

2. The computer-implemented method of claim 1, further comprising:

if the data of the respective volume group cannot be verified as deleted from the preliminary storage, retry deleting the data of the associated volume group from the preliminary storage;

if the data of the respective volume group cannot be verified as deleted from the respective volume, retry deleting the data of the associated volume group from the respective volume;

if the space on the respective volume cannot be verified as reclaimed, retry reclaiming the space on the respective volume; and if removal of the deletion information for the data of the respective volume group from the table cannot be verified, retry removing the deletion information for the data of the respective volume group from the table.

3. The computer-implemented method of claim 1, wherein the determined period is selected so as to allow pending durable storage operations associated with the data of the respective volume group to complete.

4. The computer-implemented method of claim 1, wherein the recording is performed by a first entity of the one or more computer systems, and the sorting and the processing are both performed by a second entity of the one or more computer systems that differs from the first entity.

5. A system, comprising:

at least one computing device configured to implement one or more services, wherein the one or more services are configured to:

sort a plurality of deletion requests in a deletion table into volume groups associated with one or more volumes of a plurality of storage layers associated with the system;

query the deletion table for information associated with data to be deleted from the plurality of storage layers associated with the system;

for each volume group of the volume groups, use a monotonic deletion routine to delete the data of a respective volume group from the plurality of storage layers, the monotonic deletion routine comprising causing a first storage layer of the plurality of storage layers to delete the data from the first storage layer;

as a result of verifying that the data is deleted from the first storage layer, wait for a determined period;

as a result of waiting for the determined period, cause a second storage layer to delete the data from one or more volumes of the second storage layer;

as a result of verifying that the data is deleted from the second storage layer, cause the storage layer to reclaim space on the one or more volumes;

as a result of verifying that the space on the one or more volumes is reclaimed, cause the removal of the information from the deletion table; and as a result of verifying that the deletion information is removed, confirm to at least one requester that the data is deleted.

6. The system of claim 5, wherein the first storage layer includes preliminary storage that is configured to temporarily store data prior to being durably stored by the system.

7. The system of claim 5, wherein the second storage layer includes durable storage that further comprises a plurality of volumes upon which the data is durably stored.

8. The system of claim 7, wherein the one or more services are further configured to durably store the data after a determined period of time after the data is stored in preliminary storage of the first storage layer.

9. The system of claim 7, wherein each volume of the plurality of volumes is configured to mark respective subsets of the data for deletion only if the respective subsets of data exist on a respective volume.

10. The system of claim 5, wherein the one or more services are further configured to deduce a deletion state of the data based at least in part on whether:

the data is verified as deleted from the first storage layer,
the data is verified as deleted from the second storage layer,
the space is verified as reclaimed from the one or more volumes, or
the deletion information is verified as removed from the deletion table.

11. The system of claim 10, wherein the one or more services are further configured to track the deletion state using a deletion engine associated with the at least one computing device.

12. The system of claim 5, wherein the one or more services are further configured to at least query the deletion table in response to a deletion request received by the one or more services.

13. A non-transitory computer-readable storage medium having stored thereon executable instructions that, when executed by one or more processors of a computer system, cause the computer system to at least:

sort a plurality of deletion requests into volume groups associated with one or more volumes of a plurality of storage layers associated with the computer system; and for each volume group of the volume groups, use a monotonic deletion routine to delete data of a respective volume group from the plurality of storage layers, the monotonic deletion routine comprising causing the system to delete the data stored on the plurality of storage layers associated with the computer system by at least:

removing the data from a first storage layer of the plurality of storage layers;

as a result of verifying that the data is removed from the first storage layer, waiting for a determined period;

as a result of waiting for the determined period, removing the data from a second storage layer of the plurality of storage layers;

as a result of verifying that the data is removed from the second storage layer, reclaiming space on the second storage layer;

as a result of verifying that the space on the second storage layer is reclaimed, removing, from a deletion table that tracks deleted data on the plurality of storage layers, information related to the data; and as a result of verifying that the deletion information is removed, confirming to a requester that the data is deleted.

14. The non-transitory computer-readable storage medium of claim 13, wherein the instructions further comprise instructions that, when executed by the one or more processors, cause the computer system to delete the data in response to receiving a request to delete the data.

15. The non-transitory computer-readable storage medium of claim 13, wherein the instructions further comprise instructions that, when executed by the one or more processors, cause the computer system to delete the data after detecting that a sufficient quantity of data associated with at least one volume of the second storage layer is queued for deletion.

16. The non-transitory computer-readable storage medium of claim 13, wherein the first storage layer includes preliminary storage that is configured to temporarily store data prior to being durably stored by the computer system.

17. The non-transitory computer-readable storage medium of claim 13, wherein the instructions further comprise instructions that, when executed by the one or more processors, cause the computer system to verify that the data is removed from the second storage layer by directly querying storage associated with the second storage layer for presence of the data.

18. The non-transitory computer-readable storage medium of claim 13, wherein the deletion table is stored on a deletion store associated with the computer system.

19. The non-transitory computer-readable storage medium of claim 13, wherein the instructions further comprise instructions that, when executed by the one or more processors, cause the computer system to track progress of deletion of the data using a deletion engine.

20. The non-transitory computer-readable storage medium of claim 19, wherein the deletion engine receives deletion requests via a queue.

* * * * *